United States Patent
Ogawa et al.

(10) Patent No.: US 7,711,613 B2
(45) Date of Patent: May 4, 2010

(54) SYSTEM AND METHOD, AND COMPUTER PROGRAM FOR MANAGING PRODUCT RESERVE

(75) Inventors: Yukihiro Ogawa, Tokyo (JP); Koichi Endo, Tokyo (JP); Masayuki Ishihara, Kanagawa (JP); Koji Miyoshi, Kanagawa (JP); Takashi Tsuji, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1399 days.

(21) Appl. No.: 10/326,914

(22) Filed: Dec. 23, 2002

(65) Prior Publication Data
US 2003/0126045 A1 Jul. 3, 2003

(30) Foreign Application Priority Data
Dec. 25, 2001 (JP) .............................. 2001-392669

(51) Int. Cl.
*G06Q 10/00* (2006.01)
(52) U.S. Cl. .............................. 705/28; 705/26; 705/29
(58) Field of Classification Search .................... 705/28, 705/29, 26
See application file for complete search history.

(56) References Cited

U.S. PATENT DOCUMENTS

| | | | |
|---|---|---|---|
| 5,712,989 A | 1/1998 | Johnson et al. | |
| 6,393,332 B1* | 5/2002 | Gleditsch et al. | 700/99 |
| 6,832,435 B2* | 12/2004 | Sanders et al. | 29/786 |
| 6,954,874 B1* | 10/2005 | Daferner et al. | 714/1 |
| 7,117,164 B2* | 10/2006 | Slocum | 705/10 |
| 2001/0047303 A1 | 11/2001 | Greenstone | |
| 2003/0126103 A1* | 7/2003 | Chen et al. | 706/50 |

FOREIGN PATENT DOCUMENTS

| | | |
|---|---|---|
| CN | 1147114 A | 4/1997 |
| EP | 1154359 A1 | 11/2001 |
| JP | 05-006383 | 1/1993 |
| JP | 06-337796 | 12/1994 |
| JP | 08-147374 | 6/1996 |
| JP | 08-190489 | 7/1996 |
| JP | 2001-125622 | 5/2001 |
| JP | 2005-250873 | 9/2005 |
| WO | WO 00/79450 A2 | 12/2000 |
| WO | WO 01/52158 A2 | 7/2001 |

OTHER PUBLICATIONS

Kruger G.A. (1997). "The Supply Chain Approach to Planning and Procurement Management;" *Hewlett-Packard Journal*: 48 (1): 28-38.

* cited by examiner

*Primary Examiner*—Ramsey Refai
(74) *Attorney, Agent, or Firm*—Morrison & Foerster LLP

(57) ABSTRACT

A receiving section receives a supply request for product from a terminal set up at a shop or a terminal used by a client. A first determination processing section determines whether a product in stock can be reserved for an order. A first reserve processing section reserves the product in stock for the order when the first determination processing section determines that the product can be reserved. A second determination processing section determines whether a semifinished product necessary for manufacturing a final product can be reserved when the first determination processing section determines that the product reserve is impossible. A second reserve processing section reserves the semifinished product for the order when the second determination processing section determines that the semifinished product can be reserved.

26 Claims, 18 Drawing Sheets

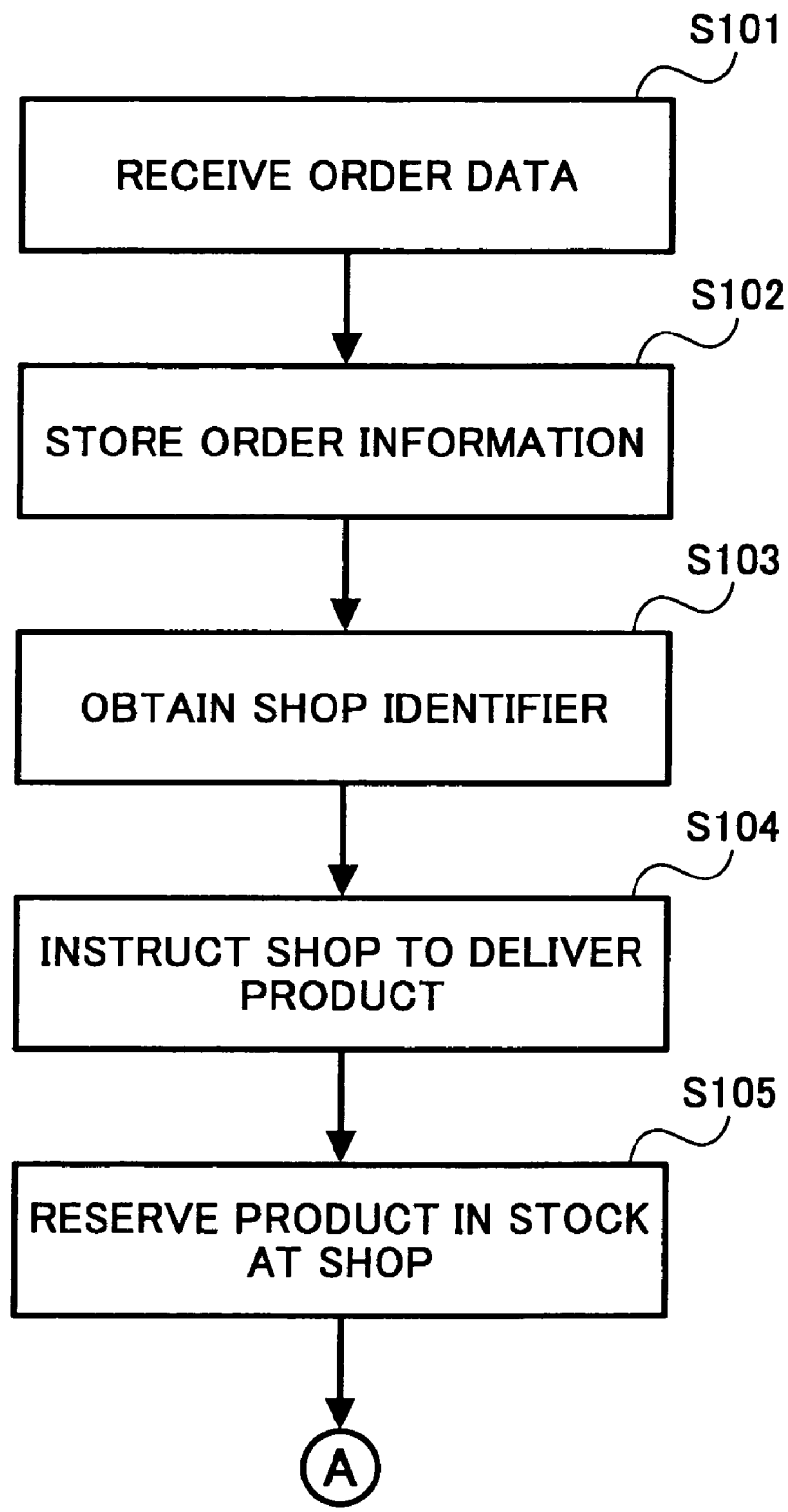

SYSTEM AND METHOD, AND COMPUTER PROGRAM FOR MANAGING PRODUCT RESERVE

FIELD OF THE INVENTION

The present invention relates to a system and method, and computer program for managing product reserve.

DESCRIPTION OF THE RELATED ART

In connection with electronic equipment such as office machines for business, they are assembled as a final product at at least one of a plurality of production bases. Each of these production bases has a different feature based on each site condition. For example, at the plurality of production bases belonging to a certain group, lead time for production is short but manufacturing cost for products is high. The production bases belonging to such a group are called as first production bases. While, at a plurality of production bases belonging to the other group, manufacturing cost is low but lead time for production is long. The production bases belonging to such a group are called as second production bases. In the production management, it is decided which production base products are manufactured and what products are manufactured.

Products manufactured at many production bases are circulated in the world and supplied to the clients. The production bases for the respective products are decided in consideration of a profit rate. The products manufactured at the respective production bases are provided to one or a plurality of shops. Each shop decides the quantity of products to be ordered to each production base based on delivery date, sales, and volume of stock in connection with the respective products. Each shop must have products in stock to some degree. Cost necessary for stock management is paid every shop.

When receiving an urgent order, one shop must secure the amount of products corresponding to the order based on a change in product line at each production base and a change in a way of transportation, a distribution channel, etc. The change in the product line or the way of transportation causes an additional cost.

In the manufacture at the first production bases, necessary expenses affect profits seriously. While, the products manufactured at the second production bases are stored in large quantity in order to prevent the opportunity to sell from being missed. Accordingly, when the sales of products are discontinued, the large amounts of products must be abandoned.

SUMMARY OF THE INVENTION

An object of the present invention is to appropriately control product reserve and a semifinished product for an order.

In order to attain the above object, a system according to the present invention is a system for managing product reserve. The system includes a first database that stores product stock information on at least one kind of product. The system further includes a second database that stores semifinished product stock information on at least one kind of semifinished product that can be used in common between a plurality of products. The system further includes a request receiving section that receives a supply request for one or a plurality of products. The system further includes a first determination processing section that determines whether the product can be reserved in response to the request received by the request receiving section based on product stock information stored in the first database. The system further includes a first reserve processing section that reserves the product in response to the request received by the request receiving section when the first determination processing section determines that the product can be reserved. The system further includes a second determination processing section that determines whether a semifinished product necessary for production of a final product can be reserved in response to the request received by the request receiving section based on semifinished product stock information stored in the second database when the first determination processing section determines that the product reserve is impossible. The system further includes a second reserve processing section that reserves the semifinished product in response to the request received by the request receiving section when the second determination processing section determines that the semifinished product can be reserved.

According to the above configuration, when the product in stock cannot be reserved in response to the supply request for product, the semifinished product necessary for assembling the final product can be reserved in response to the request. Accordingly, a period of time required before the product for the order is completed can be reduced. In addition, the stock of product can be reduced.

Product stock information stored in the first database may include a first type of stock information on a current product and a second type of stock information on a future product. The first determination processing section may determine whether the current product in stock can be reserved in response to the request received by the request receiving section based on the first type of stock information stored in the first database. The first determination processing section may further determine whether the future product in stock can be reserved in response to the request received by the request receiving section based on the second type of stock information stored in the first database when the first determination processing section determines that the reserve of the current product in stock is impossible. The first reserve processing section may reserve the product in response to the request received by the request receiving section when the first determination processing section determines that the current product in stock can be reserved or the future product in stock can be reserved.

According to this configuration, when the current product in stock cannot be reserved, the future product in stock can be reserved in response to the supply request for product. Accordingly, in consideration of the production schedule of product, it is possible to appropriately reserve the product.

The semifinished product stock information stored in the second database may include a first type of stock information on a current semifinished product and a second type of stock information on a future semifinished product. The second determination processing section may determine whether the current semifinished product in stock can be reserved in response to the request received by the request receiving section based on the first type of stock information stored in the second database. The second determination processing section may further determine whether the future semifinished product in stock can be reserved in response to the request received by the request receiving section based on the second type of stock information stored in the second database when the second determination processing section determines that the reserve of the current semifinished product in stock is impossible. The second reserve processing section may reserve the semifinished product in response to the request received by the request receiving section when the second determination processing section determines that the current semifinished product in stock can be reserved or the future semifinished product in stock can be reserved.

According to this configuration, when the current semifinished product in stock cannot be reserved, the future semifinished product in stock can be reserved in response to the supply request for product. Accordingly, in consideration of the production schedule of semifinished product, it is possible to appropriately reserve the semifinished product.

Product stock information stored in the first database may include a first type of stock information indicating a stock of product at each of a plurality of production bases and a second type of stock information indicating a stock of product at each of plurality of shops. The first determination processing section may include a selection section that selects at least one of the plurality of production bases and the plurality of shops as a supply source for the product designated by the request received by the request receiving section. The first determination processing section may further include a third determination processing section that determines whether the product in stock at the supply source selected by the selection section can be reserved in response to the request received by the request receiving section based on the first type or second type of stock information stored in the first database. The first determination processing section may further include a fourth determination processing section that determines whether the product in stock at another production base or another shop indicated in first type or second type stock information can be reserved when the third determination processing section determines that reserve of the product is impossible. The first reserve processing section may reserve the product in response to the request received by the request receiving section when the third or fourth determination processing section determines that the product can be reserved.

According to this configuration, when the product in stock at the supply source selected by the selection section cannot be reserved, the product in stock at another production base and another shop can be reserved in response to the supply request for product. Accordingly, in consideration of the stock of the overall product, it is possible to appropriately reserve the product.

The selection section may specify a shop geographical position or a client geographical position where the product is provided, and select a supply source for the product corresponding to the specified position.

Semifinished product stock information stored in the second database may include a first type of stock information indicating a stock of semifinished product at each of a plurality of first production bases suitable for the production of semifinished product and a second type of stock information indicating a stock of semifinished product at each of a plurality of second production bases suitable for the production of final product. The second determination processing section may include a selection section that selects at least one of the plurality of first and second production bases as a supply source for the semifinished product corresponding to the request received by the request receiving section. The second determination processing section may further include a third determination processing section that determines whether the semifinished product in stock at the supply source selected by the selection section can be reserved in response to the request received by the request receiving section based on the first type or second type of stock information stored in the second database. The second determination processing section may further include a fourth determination processing section that determines whether the semifinished product in stock at another production base indicated in first type or second type stock information can be reserved when the third determination processing section determines that reserve of the semifinished product is impossible. The second reserve processing section may reserve the semifinished product in response to the request received by the request receiving section when the third or fourth determination processing section determines that the semifinished product can be reserved.

According to this configuration, when the semifinished product in stock at the supply source selected by the selection section cannot be reserved, the semifinished product in stock at another production base can be reserved in response to the supply request for product. Accordingly, in consideration of the stock of the overall semifinished product, it is possible to appropriately reserve the semifinished product.

The selection section may specify a shop geographical position or a client geographical position where the product is provided, and select a supply source for the semifinished product corresponding to the specified position.

The system may further include a first terminal that is set up at a production base appropriate for assembling a product. The system may further include a second terminal that is set up at a production base appropriate for manufacturing a semifinished product. The system may further include a third terminal that is set up at a supply source for a part necessary for manufacturing a semifinished product. The system may further include a first transmitting section that transmits a replenishment request for product manufactured based on product stock information stored in the first database to the first terminal. The system may further include a second transmitting section that transmits a replenishment request for semifinished product to the second terminal in accordance with the product required for replenishment. The system may further include a third transmitting section that transmits a replenishment request for part to the third terminal in accordance with the semifinished product required for replenishment.

The first transmitting section may transmit a replenishment request on a product whose volume of stock at at least one of a plurality of shops falls below a predetermined threshold value.

A method of the present invention is a method for managing product reserve. The method includes the step of storing product stock information on at least one kind of product. The method may include the step of storing semifinished product stock information on at least one kind of semifinished product that can be used in common between a plurality of products. The method may include the step of receiving a supply request for one or a plurality of products. The method may include the step of determining whether the product can be reserved in response to the supply request based on product stock information stored in the first database. The method may include the step of reserving the product in response to the supply request when it is determined that the product can be reserved. The method may include the step of determining whether a semifinished product necessary for production of a final product can be reserved in response to the supply request received based on semifinished product stock information stored in the second database when it is determined that the product reserve is impossible. The method may include the step of reserving the semifinished product in response to the supply request when it is determined that the semifinished product can be reserved.

The method may further include the step of storing a first type of stock information on a current product and a second type of stock information on a future product to the first database. The method may further include the step of determining whether the current product in stock can be reserved in response to the supply request based on the first type of stock information stored in the first database. The method may further include the step of determining whether the future product in stock can be reserved in response to the supply request based on the second type of stock information stored in the first database when it is determined that the reserve of the current product in stock is impossible. The method may further include the step of reserving the product in response to the supply request when it is determined that the current product in stock can be reserved or the future product in stock can be reserved.

The method may further include the step of storing a first type of stock information on a current semifinished product and a second type of stock information on a future semifinished product to the second database. The method may further include the step of determining whether the current semifinished product in stock can be reserved in response to the supply request based on the first type of stock information stored in the second database. The method may further include the step of determining whether the future semifinished product in stock can be reserved in response to the supply request based on the second type of stock information stored in the second database when it is determined that the reserve of the current semifinished product in stock is impossible. The method may further include the step of reserving the semifinished product in response to the supply request when it is determined that the current semifinished product in stock can be reserved or the future semifinished product in stock can be reserved.

The method may further include the step of storing a first type of stock information indicating a stock of product at each of a plurality of production bases and a second type of stock information indicating a stock of product at each of a plurality of shops to the first database. The method may further include the step of selecting at least one of the plurality of production bases and the plurality of shops as a supply source for the product designated by the supply request. The method may further include the step of determining whether the product in stock at the selected supply source can be reserved in response to the supply request received based on the first type or second type of stock information stored in the first database. The method may further include the step of determining whether the product in stock at another production base or another shop indicated in first type or second type stock information can be reserved when it is determined that reserve of the product is impossible. The method may further include the step of reserving the product in response to the supply request when it is determined that the product in stock at at least one of the plurality of production bases and the plurality of shops can be reserved.

The method may further include the step of specifying a shop geographical position or a client geographical position where the product is provided. The method may further include the step of selecting a supply source for the product corresponding to the specified position.

The method may further include the step of storing a first type of stock information indicating a stock of semifinished product at each of a plurality of first production bases suitable for the production of semifinished product and a second type of stock information indicating a stock of semifinished product at each of a plurality of second production bases suitable for the production of final product to the second database. The method may further include the step of selecting at least one of the plurality of first and second production bases as a supply source for the semifinished product corresponding to the supply request. The method may further include the step of determining whether the semifinished product in stock at the selected supply source can be reserved in response to the supply request based on the first type or second type of stock information stored in the second database. The method may further include the step of determining whether the semifinished product in stock at another production base indicated in first type or second type stock information can be reserved when it is determined that reserve of the semifinished product is impossible. The method may further include the step of reserving the semifinished product in response to the supply request when it is determined that the semifinished product in stock at at least one of the plurality of first and second production bases can be reserved.

The method may further include the step of specifying a shop geographical position or a client geographical position where the product is provided. The method may further include the step of selecting a supply source for the semifinished product corresponding to the specified position.

The method may further include the step of generating a replenishment request for product whose volume of stock falls below a threshold value predetermined for each shop based on product stock information stored in the first database. The method may further include the step of transmitting the replenishment request for product to a first terminal that is set up at a production base appropriate for assembling a product. The method may further include the step of transmitting a replenishment request for semifinished product corresponding to the product required for replenishment to a second terminal that is set up at a production base appropriate for manufacturing a semifinished product. The method may further include the step of transmitting a replenishment request for part corresponding to the semifinished product required for replenishment to a third terminal that is set up at a supply source for a part necessary for manufacturing a semifinished product.

The replenishment request for product may replenish a product whose volume of stock at at least one of a plurality of shops falls below the predetermined threshold value.

A computer program according to this invention includes an instruction for storing product stock information on at least one kind of product in a first database. The computer program further includes an instruction for storing semifinished product stock information on at least one kind of semifinished product that can be used in common between a plurality of products in a second database. The computer program further includes an instruction for receiving a supply request for one or a plurality of products. The computer program further includes an instruction for determining whether the product can be reserved in response to the supply request based on product stock information stored in the first database. The computer program further includes an instruction for reserving the product in response to the supply request when it is determined that the product can be reserved. The computer program further includes an instruction for determining whether a semifinished product necessary for production of a final product can be reserved in response to the supply request received based on semifinished product stock information stored in the second database when it is determined that the product reserve is impossible. The computer program further includes an instruction for reserving the semifinished product in response to the supply request when it is determined that the semifinished product can be reserved.

The computer program may further include an instruction for storing a first type of stock information on a current product and a second type of stock information on a future product to the first database. The computer program may further include an instruction for determining whether the current product in stock can be reserved in response to the supply request based on the first type of stock information stored in the first database. The computer program may further include an instruction for determining whether the future product in stock can be reserved in response to the supply request based on the second type of stock information stored in the first database when it is determined that the reserve of the current product in stock is impossible. The computer program may further include an instruction for reserving the product in response to the supply request when it is determined that the current product in stock can be reserved or the future product in stock can be reserved.

The computer program may further include an instruction for storing a first type of stock information on a current semifinished product and a second type of stock information on a future semifinished product to the second database. The computer program may further include an instruction for determining whether the current semifinished product in stock can be reserved in response to the supply request based on the first type of stock information stored in the second database. The computer program may further include an instruction for determining whether the future semifinished product in stock can be reserved in response to the supply request based on the second type of stock information stored in the second database when it is determined that the reserve of the current semifinished product in stock is impossible. The computer program may further include an instruction for reserving the semifinished product in response to the supply request when it is determined that the current semifinished product in stock can be reserved or the future semifinished product in stock can be reserved.

The computer program may further include an instruction for storing a first type of stock information indicating a stock of product at each of a plurality of production bases and a second type of stock information indicating a stock of product at each of a plurality of shops to the first database. The computer program may further include an instruction for selecting at least one of the plurality of production bases and the plurality of shops as a supply source for the product designated by the supply request. The computer program may further include an instruction for determining whether the product in stock at the selected supply source can be reserved in response to the supply request received based on the first type or second type of stock information stored in the first database. The computer program may further include an instruction for determining whether the product in stock at another production base or another shop indicated in first type or second type stock information can be reserved when it is determined that reserve of the product is impossible. The computer program may further include an instruction for reserving the product in response to the supply request when it is determined that the product in stock at at least one of the plurality of production bases and the plurality of shops can be reserved.

The computer program may further include an instruction for specifying a shop geographical position or a client geographical position where the product is provided. The computer program may further include an instruction for selecting a supply source for the product corresponding to the specified position.

The computer program may further include an instruction for storing a first type of stock information indicating a stock of semifinished product at each of a plurality of first production bases suitable for the production of semifinished product and a second type of stock information indicating a stock of semifinished product at each of a plurality of second production bases suitable for the production of final product to the second database. The computer program may further include an instruction for selecting at least one of the plurality of first and second production bases as a supply source for the semifinished product corresponding to the supply request. The computer program may further include an instruction for determining whether the semifinished product in stock at the selected supply source can be reserved in response to the supply request based on the first type or second type of stock information stored in the second database. The computer program may further include an instruction for determining whether the semifinished product in stock at another production base indicated in first type or second type stock information can be reserved when it is determined that reserve of the semifinished product is impossible. The computer program may further include an instruction for reserving the semifinished product in response to the supply request when it is determined that the semifinished product in stock at at least one of the plurality of first and second production bases can be reserved.

The computer program may further include an instruction for specifying a shop geographical position or a client geographical position where the product is provided. The computer program may further include an instruction for selecting a supply source for the semifinished product corresponding to the specified position.

The computer program may further include an instruction for generating a replenishment request for product whose volume of stock falls below a threshold value predetermined for each shop based on product stock information stored in the first database. The computer program may further include an instruction for transmitting the replenishment request for product to a first terminal that is set up at a production base appropriate for assembling a product. The computer program may further include an instruction for transmitting a replenishment request for semifinished product corresponding to the product required for replenishment to a second terminal that is set up at a production base appropriate for manufacturing a semifinished product. The computer program may further include an instruction for transmitting a replenishment request for part corresponding to the semifinished product required for replenishment to a third terminal that is set up at a supply source for a part necessary for manufacturing a semifinished product.

The replenishment request for product replenishes a product whose volume of stock at at least one of a plurality of shops falls below the predetermined threshold value.

BRIEF DESCRIPTION OF THE DRAWINGS

These objects and other objects and advantages of the present invention will become more apparent upon reading of the following detailed description and the accompanying drawings in which:

FIGS. 9A, 9B, and 9C are flowcharts showing processing for reserving products or semifinished products from an order;

DETAILED DESCRIPTION OF THE PREFERRED EMBODIMENTS

A system according to the present invention will be explained.

In the explanation made below, a semifinished product is a component part that can be used in common between a plurality of kinds of products. For example, the plurality of kinds of products is electronic equipment. The product is completed by assembling a plurality of semifinished products. One semifinished product is manufactured using a plurality of parts.

A plurality of first production bases is located at a plurality of consumption areas. For example, each consumption area includes a market. The plurality of consumption areas are dispersed in the world. In each consumption area, one or more shops and one or more part suppliers are located in addition to the first production bases. At each shop, the products supplied from the first production bases are sold. At each of the first production bases, a product as a finished product is assembled. The first production bases are in a condition of readiness to response to a client's desire flexibly.

A plurality of second production bases is located at a plurality of production areas. For example, the plurality of production areas includes an area where low-paying labor and low-price parts are supplied and an area where high-quality labor and high production technique are provided. The plurality of production areas is dispersed in the world. At each of the second production bases, semifinished products of at least one kind are manufactured. In each production base, one or more part suppliers are located in addition to the second production bases. The parts supplied from the respective part suppliers are transported to the second production base that is located at the same production area.

Figure 1:
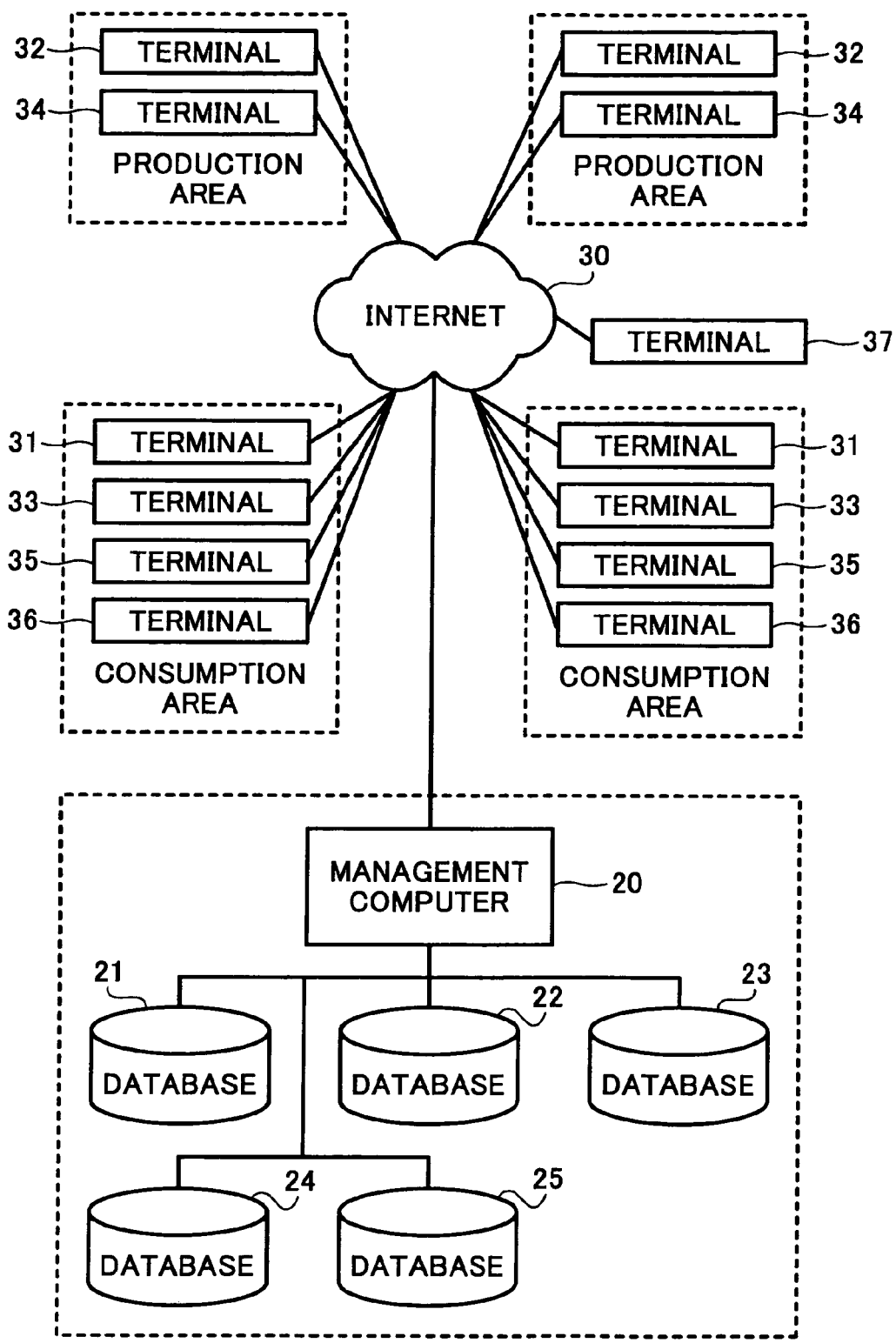
FIG. 1 is a block diagram showing a system according to this invention.

FIG. 1 shows one example of a configuration of a system according to the present invention.

In the system shown in FIG. 1, a management computer 20 set up at a management center and first to seventh terminals 31 to 37 are connected to each other via an Internet 30.

For example, each of the terminals 31 to 37 includes a CPU (Central Processing Unit), a ROM (Read Only Memory), a RAM (Random Access Memory), a HDD (Hard Disk Drive), a network interface, a monitor display, a keyboard, a mouse, etc., (not shown).

Each of first terminals 31 is set up at each of the plurality of first production bases. Each of second terminals 32 is set up at each of the plurality of second production bases. Each of the plurality of third terminals 33 is set up at each of a plurality of part suppliers that are located in the consumption area. Each of the plurality of fourth terminals 34 is set up at each of a plurality of part suppliers that are located in the production area. Each of the plurality of fifth terminal 35 is set up at each of a plurality of shops that are located in the consumption area. Each of the plurality of sixth terminals 36 is used by each of a plurality of clients that are present in the consumption area. At least one of seventh terminals 37 is set at the design department of the manufacturing company.

The management computer 20 set up at the management center includes CPU, ROM, RAM, HDD, network interface, etc. (not shown).

The management computer 20 is connected to the first to fifth data bases 21 to 25.

Figure 2:
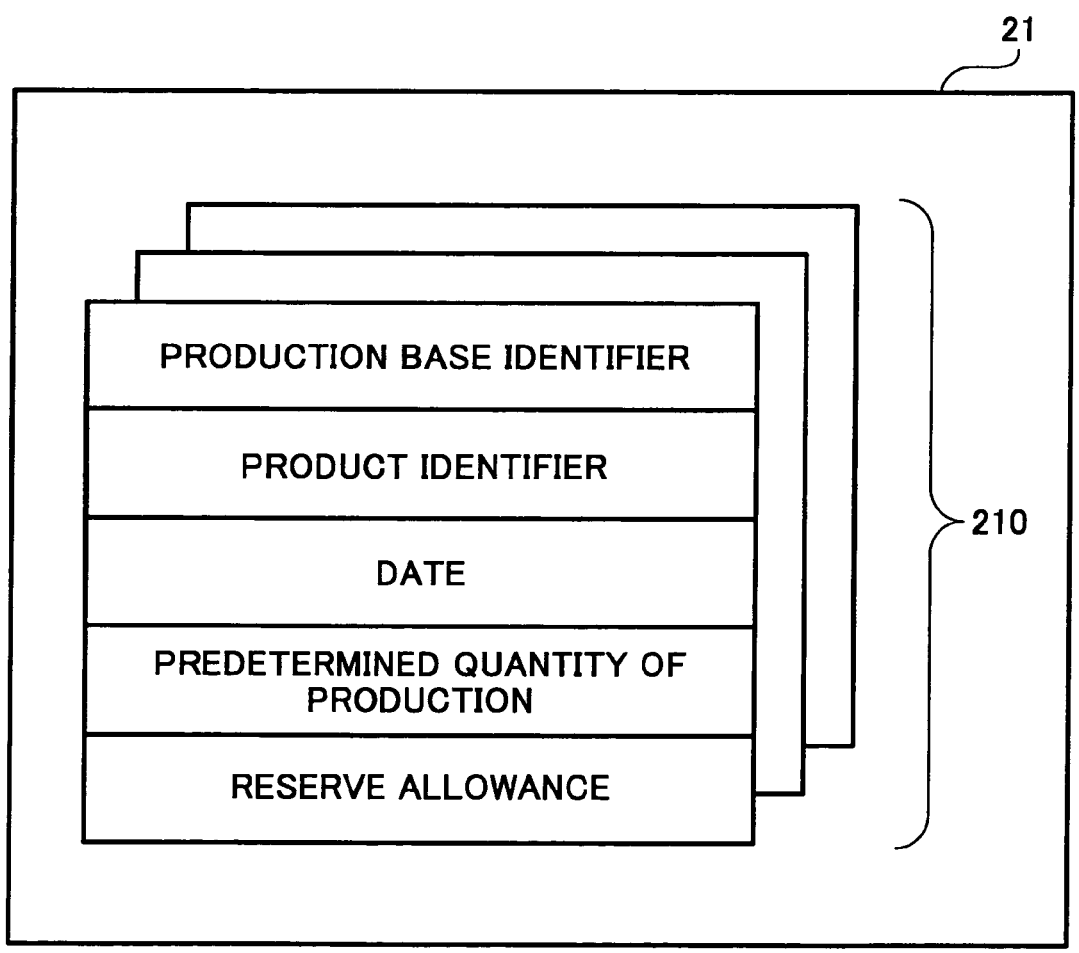
FIG. 2 shows one example of planning information to be stored in a first database.

The first database 21 stores planning information 210 for each date as shown in FIG. 2.

Planning information 210 includes various data indicative of "production base identifier", "product identifier", "date", "predetermined quantity of production", "allowance of reserve", etc. "Production base identifier" of planning information 210 makes it possible for the management computer 20 to identify each of the first production bases in the consumption area. "Product identifier" of planning information 210 makes it possible for the management computer 20 to identify the product manufactured at the first production base. "Date" of planning information 210 indicates that assembly of product is expected to be completed in the production plan of the first production base. "Predetermined quantity of production" of planning information 210 indicates the quantity of product whose assembly is expected to be completed at the first production base on date indicated by the corresponding "date." "Allowance of reserve" of planning information 210 indicates the quantity of product that can be reserved for a nonspecific order. For example, if the date indicated by the corresponding "date" of planning information 210 is prior to today's date, "allowance of reserve" is included in a current volume of products in stock at the first production base. While, if the date indicated by the corresponding "date" of planning information 210 is posterior to today's date, "allowance of reserve" is included in a virtual stock volume of future products at the first production bases. Planning information 210 is generated according to the assembly plan of product. When the products are transported to the shop from the first production base, planning information 210 corresponding to the products to be transported is updated.

Figure 3:
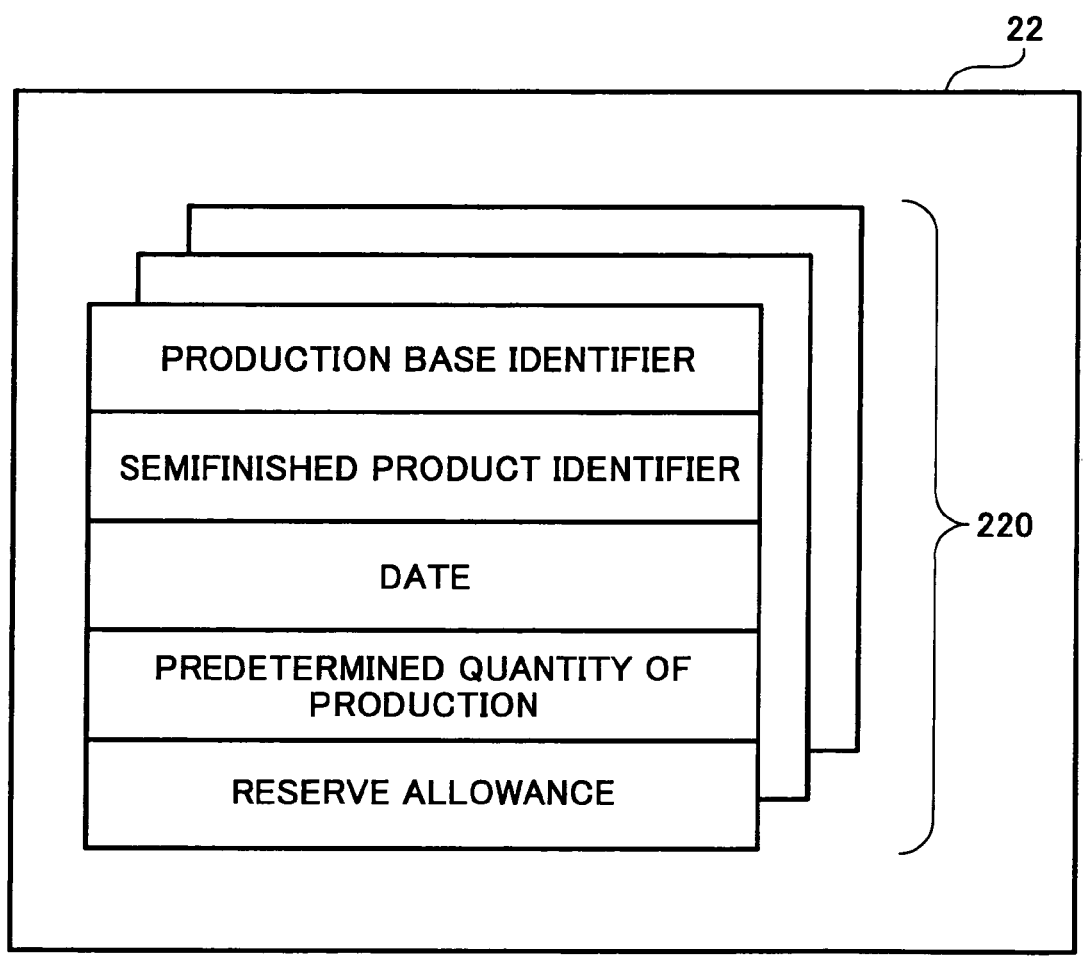
FIG. 3 shows one example of planning information to be stored in a second database.

The second database 22 stores planning information 220 for each date as shown in FIG. 3.

Planning information 220 includes various data indicative of "production base identifier", "semifinished product identifier", "date", "predetermined quantity of production", "allowance of reserve", etc.

"Production base identifier" of planning information 220 makes it possible for the management computer 20 to identify each of the second production bases in the production area. "Semifinished product identifier" of planning information 220 makes it possible for the management computer 20 to identify the semifinished product manufactured at the second production base. "Date" of planning information 220 indicates that the semifinished product is expected to be manufactured in the production plan of the second production base. "Predetermined quantity of production" of planning information 220 indicates the quantity of semifinished product to be manufactured at the second production on date indicated by the corresponding "date." "Allowance of reserve" of planning information 220 indicates the quantity of semifinished product that can be reserved for a nonspecific order. For example, if the date indicated by the corresponding "date" of planning information 220 is prior to today's date, "allowance of reserve" is included in a current volume of products in stock at the second production base. While, if the date indicated by the corresponding "date" of planning information 220 is posterior to today's date, "allowance of reserve" is included in a virtual stock volume of future semifinished products at the second production base. Planning information 220 is generated according to the production plan of semifinished product. When the semifinished products are transported to the first production base from the second production base, planning information 220 corresponding to the semifinished products to be transported is updated.

Figure 4:
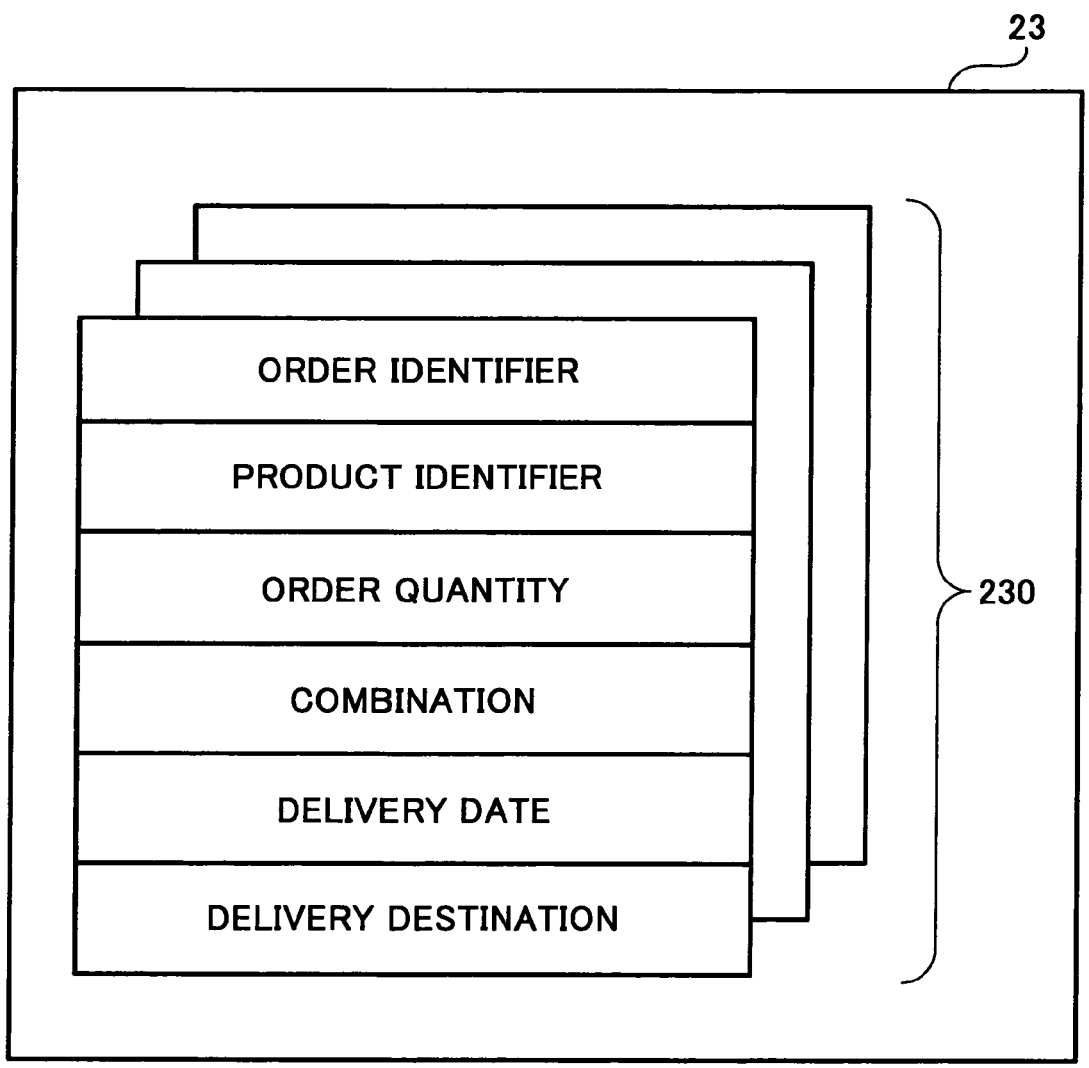
FIG. 4 shows one example of order information to be stored in a third database.

The third database 23 stores order information 230 as shown in FIG. 4. Order information 230 is classified according to an order sent from the shop or client.

Order information 230 includes various data indicative of "order identifier", "product identifier", "order quantity", "combination", "delivery date", "delivery destination", etc.

"Order identifier" of order information 230 makes it possible for the management computer 20 to identify each of a plurality of orders sent from the shop or client. For example, this identifier is a serial code allocated uniquely by the management computer 20. "Product identifier" in order information 230 makes it possible for the management computer 20 to identify the ordered product. "Order quantity" of order information 230 indicates the quantity of product ordered from the shop or client. "Combination" of order information 230 is set by referring to first type information 241 (to be described later). "Delivery date" of order information 230 indicates the date on which the product should be transported to the shop or client. "Delivery destination" of order information 230 indicates a location where the product should be delivered. This destination may include a name of the shop or client. Order information 230 is generated in response to the reception of the order from the shop or client by the management computer 20.

Figure 5:
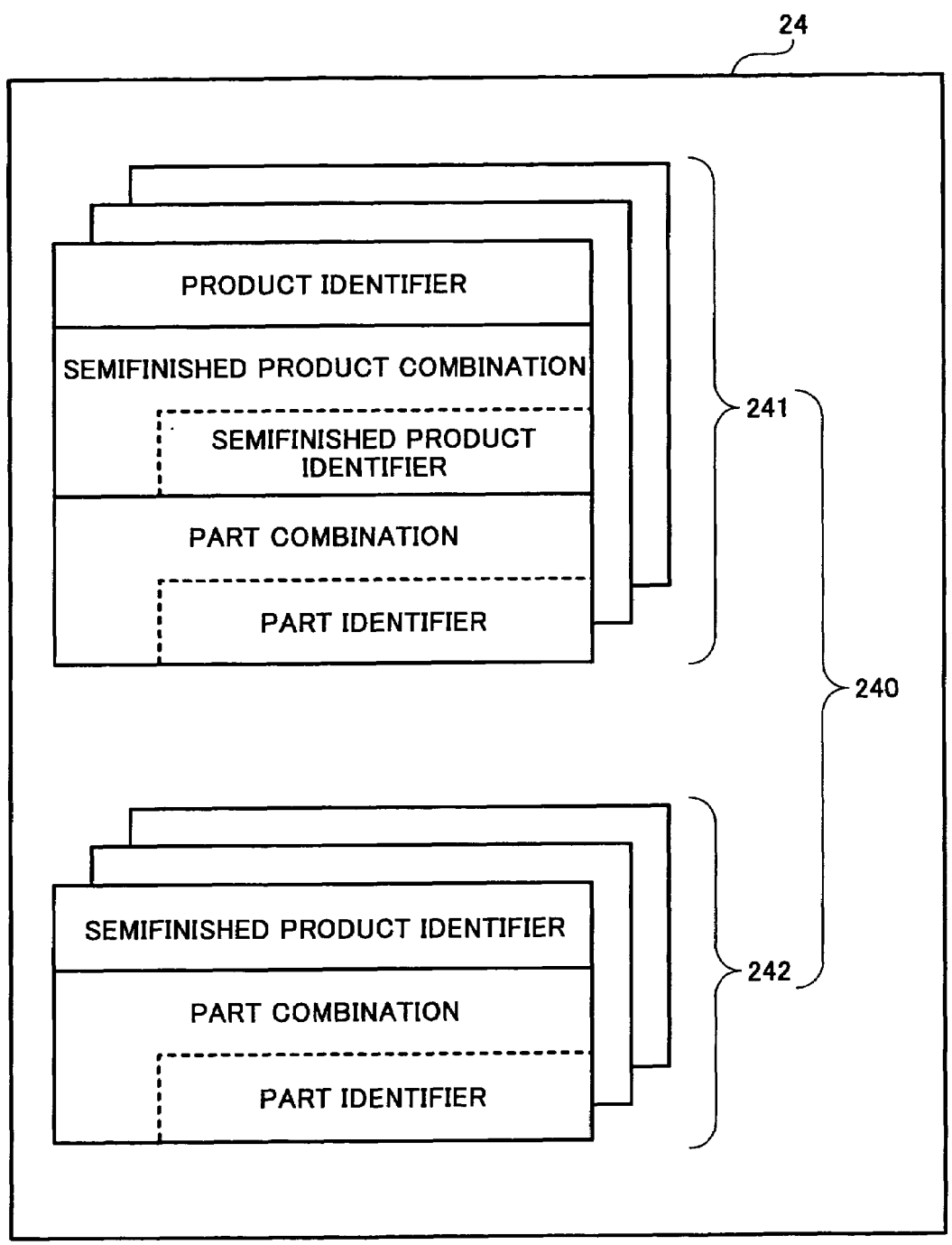
FIG. 5 shows one example of design information to be stored in a fourth database.

The fourth database 24 stores design information 240 as shown in FIG. 5. Design information 240 includes first type information 241 and second type information 242. First type information 241 is generated to be associated with each of final products of a plurality of kinds. Second type information 242 is generated to be associated with each of semifinished products of a plurality of kinds.

First type information 241 includes various kinds of data indicative of "product identifier", "combination of semifinished products", "combination of parts", etc. "Product identifier" of first type information 241 makes it possible for the management computer 20 to identify the product to be designed. "Combination of semifinished products" of first type information 241 indicates one or a plurality of semifinished products necessary for assembling the product. This combination data includes a semifinished product identifier. "Combination of parts" of first type information 241 indicates one or a plurality of parts necessary for assembling the product. This combination data includes a part identifier.

Second type information 242 includes various kinds of data indicative of "semifinished product identifier", "combination of parts", etc. "Semifinished product identifier" of second type information 242 makes it possible for the management computer 20 to identify the semifinished product to be manufactured. "Combination of parts" of second type information 242 indicates one or a plurality of parts necessary for manufacturing the semifinished product. This combination data includes a part identifier. Design information 240 is generated by the management computer 20 and updated by data input by the terminal 37.

Figure 6:
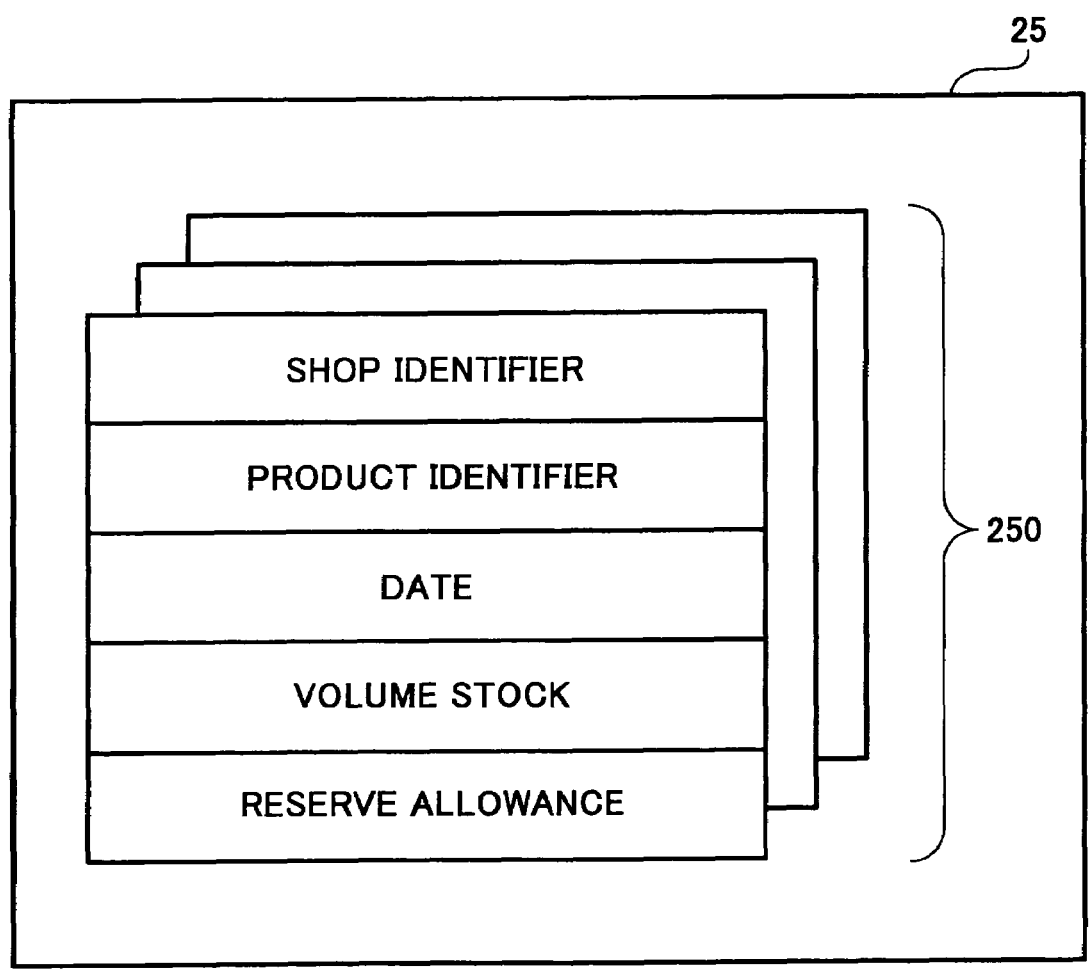
FIG. 6 shows one example of shop information to be stored in a fifth database.

The fifth database 25 stores shop information 250 as shown in FIG. 6. Shop information 250 is classified according to the shop and product.

Shop information 250 includes various kinds of data indicative of "shop identifier", "product identifier", "date", "volume of stock", and "allowance of reserve" etc.

"Shop identifier" of shop information 250 makes it possible for the management computer 20 to identify each of a plurality of shops located in the consumption area. "Product identifier" of shop information 250 makes it possible for the management computer 20 to identify the product to be sold at each shop. "Date" of shop information 250 indicates the date on which the stock of products has been checked by the shop. For example, if the corresponding date is posterior to today's date, shop information 250 shows a schedule in which goods are carried in the shop. "Volume of stock" of shop information 250 indicates the stock of products at each shop. "Allowance of reserve" of shop information 250 indicates the quantity of products that can be reserved for the order from the client or other shop. For example, if the date indicated by the corresponding "date" of shop information 250 is prior to today's date, "allowance of reserve" is included in a current volume of products in stock at the shop. While, if the date indicated by the corresponding "date" of shop information 250 is posterior to today's date, "allowance of reserve" is included in a stock volume of future products at the shop. Shop information 250 is updated in response to the order from the shop or client and check data sent from each shop.

Figure 7:
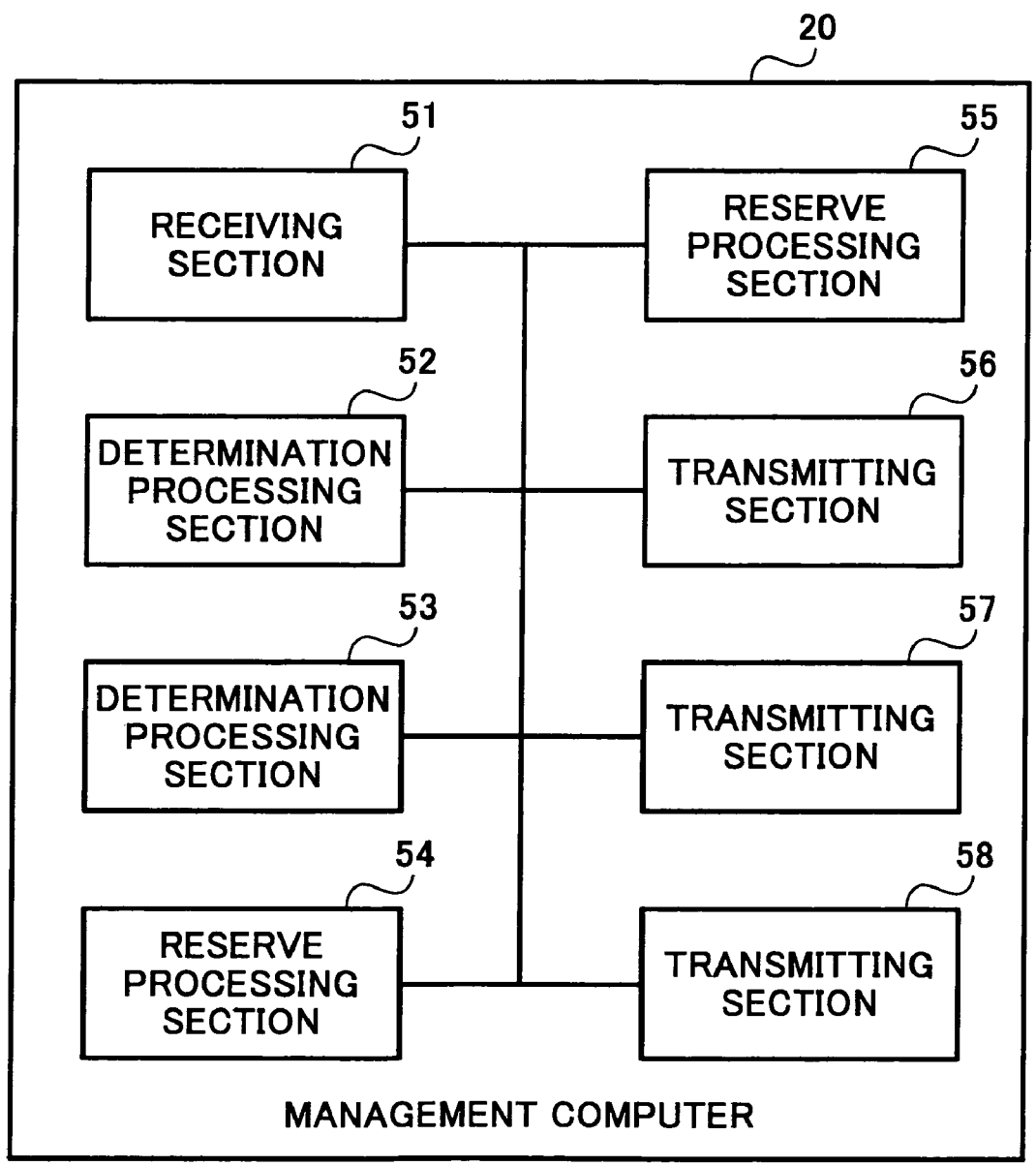
FIG. 7 is a block diagram showing a configuration of a management computer.

The management computer 20 includes a receiving section 51, a determination processing sections 52, 53, reserve processing sections 54, 55, and transmitting sections 56 to 58 as shown in FIG. 7. The structure shown in FIG. 7 is achieved when the management computer 20 executes a software program suitable for production management.

The receiving section 51 receives a supply request for product from the terminal 35 set up at each shop and the terminal 36 that each user uses. The supply request for product is order data including data indicative of product identifier, product quantity, delivery date, delivery destination, etc. Order information 230 is generated based on the supply request for product received by the receiving section 51.

The first determination processing section 52 determines whether the product can be reserved for the order from the shop or client based on planning information 210 and shop information 250. The second determination processing section 53 determines whether the semifinished product can be reserved for the order from the shop or client based on planning information 210 and 220.

Figure 8:
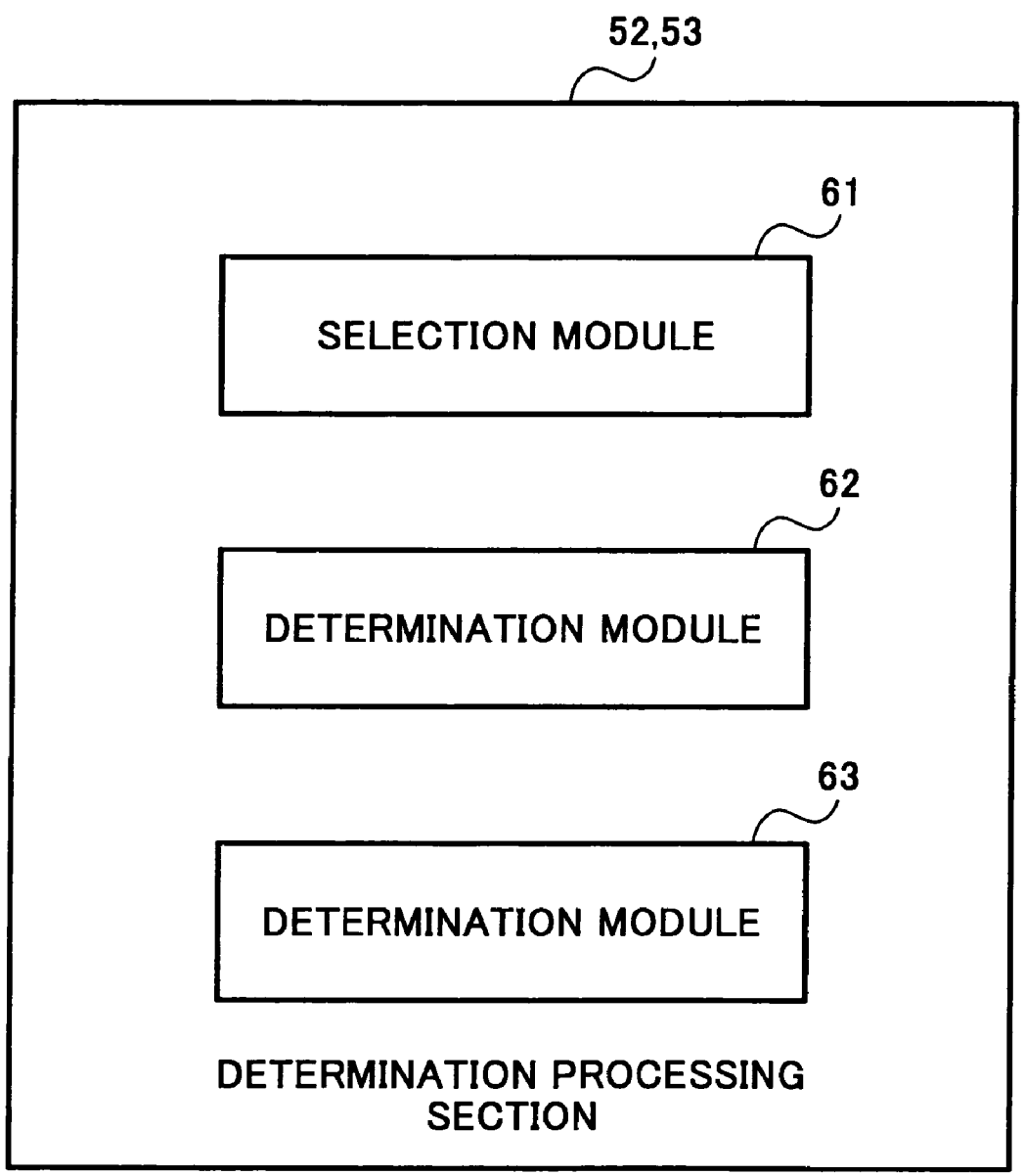
FIG. 8 is a block diagram showing a configuration of a determination processing section.

Each of determination processing sections 52 and 53 includes a selection module 61, a first determination module 62, and a second determination module 63 as shown in FIG. 8.

The selection module 61 selects one from among the plurality of production bases and the plurality of shops.

For example, in the determination processing section 52, the selection module 61 selects one from among the plurality of first production bases and the plurality of shops as a supply source for products. In order to decide a supply source for products, the selection module 61 specifies a geographical position of the shop to which the product is provided or a geographical position of the client by referring to order information 230. The supply source for products is decided according to the geographical position of the shop or the geographical position of the client by the selection module 61.

On the other hand, in the determination processing section 53, the selection module 61 selects one from among the plurality of first production bases and the plurality of second production bases as a supply source for semifinished products. In order to decide the supply source for semifinished products, the selection module 61 specifies a geographical position of the shop to which the product is provided or a geographical position of the client by referring to order information 230. The supply source for semifinished products is decided according to the geographical position of the shop or the geographical position of the client by the selection module 61.

In the determination processing section 52, the first determination module 62 determines whether the product in stock at the supply source selected by the selection module 61 can be reserved for the order from the shop or client. In order to check the product in stock at the supply source, the first determination module 62 refers to planning information 210 and shop information 250.

In the determination processing section 53, the first determination module 62 determines whether the semifinished product in stock at the supply source selected by the selection module 61 can be reserved for the order from the shop or client. In order to check the semifinished product in stock at the supply source, the first determination module 62 refers to planning information 210 and 220.

In the determination processing section 52, the second determination module 63 determines whether the product in stock at the other production base and other shop can be reserved when the first determination module 62 determines that the product in stock at the supply source cannot be reserved. In order to check the product in stock at the other production base and other shop, the second determination module 63 refers to planning information 210 and shop information 250.

In the determination processing section 53, the second determination module 63 determines whether the semifinished product in stock at the other production base can be reserved when the first determination module 62 determines that the semifinished product in stock at the supply source cannot be reserved. In order to check the semifinished product in stock at the other production base, the second determination module 63 refers to planning information 210 and 220.

The first reserve processing section 54 executes processing for reserving the product for the order from the shop or client when the determination processing section 52 determines that the product can be reserved. The reserve processing section 54 updates planning information 210 and/or shop information 250 when the product is reserved for the order.

The second reserve processing section 55 executes processing for reserving the semifinished product for the order from the shop or client when the determination processing section 53 determines that the semifinished product can be reserved. The reserve processing section 55 updates planning information 210 and 220 when the semifinished product is reserved for the order.

The first transmitting section 56 transmits a replenishment request for product to at least one of the plurality of terminals 31 provided at the plurality of first production bases. The replenishment request for product includes data indicative of the shop identifier, product identifier, the product quantity, delivery date, etc. The replenishment request for product is generated when "volume of stock" of shop information 250 falls below a predetermined threshold value.

The second transmitting section 57 transmits a replenishment request for semifinished product to at least one of the plurality of terminals 32 provided at the plurality of second production bases according to the product that is required for replenishment. The replenishment request for semifinished product includes data indicative of the identifier of the first production base, identifier of semifinished product, quantity of semifinished product, delivery date, etc. The kind of semifinished product that is required for replenishment is decided by referring to first type information 241 of design information 240. The quantity of semifinished product that is required for replenishment is decided according to the quantity of product that is required for replenishment.

The third transmitting section 58 transmits a replenishment request for part to at least one of the plurality of terminals 33 and 34 provided at the plurality of part suppliers according to the semifinished product that is required for replenishment. The replenishment request for part includes data indicative of the identifier of the second production base, identifier of part, quantity of part, delivery date, etc. The kind of part that is required for replenishment is decided by referring to first type information 241 and second type information 242 of design information 240. The quantity of part that is required for replenishment is decided according to the product that is required for replenishment and the quantity of semifinished product.

The following will explain an operation of the system according to this invention.

Figure 9B:
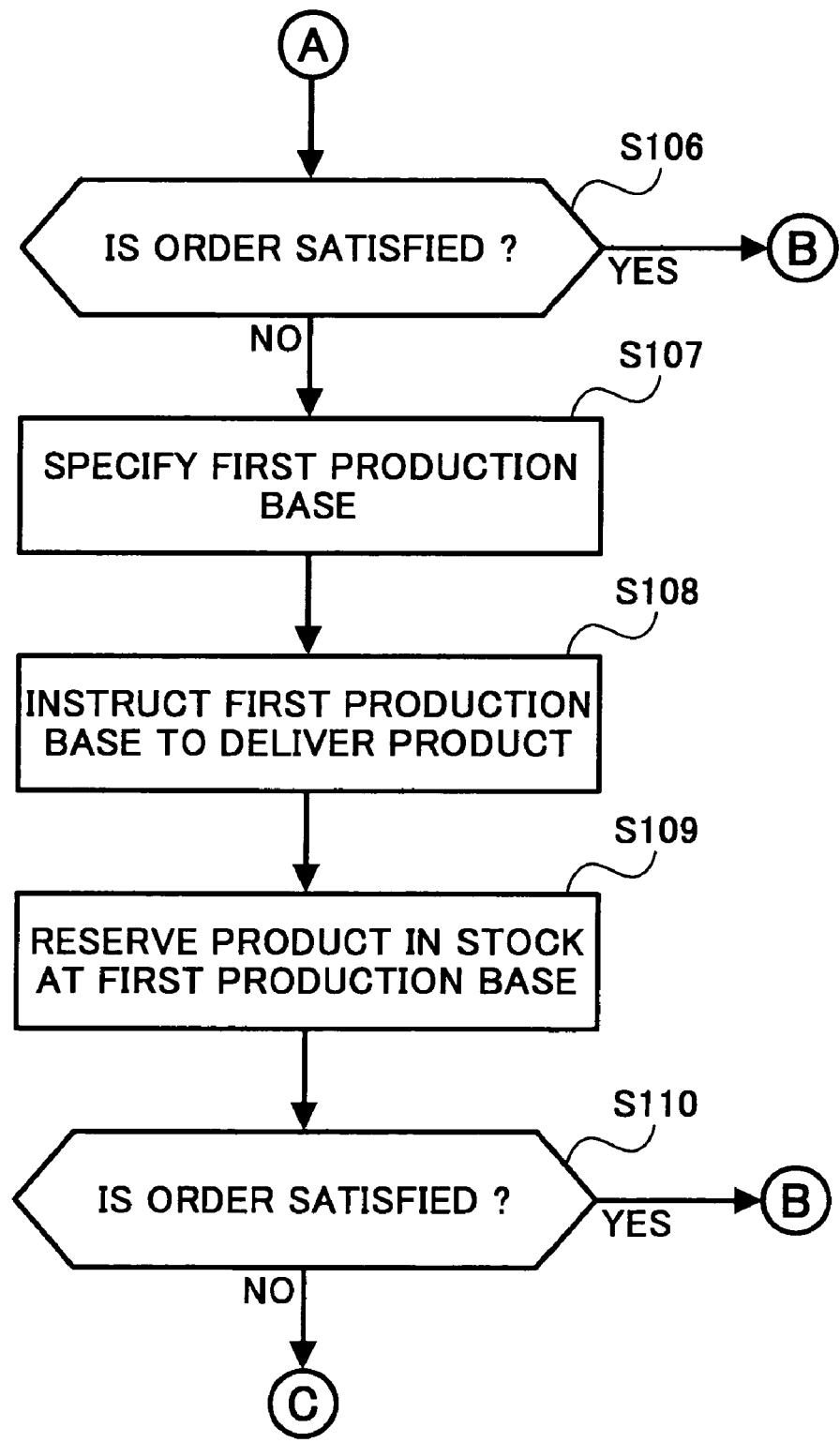
Figure 9C:
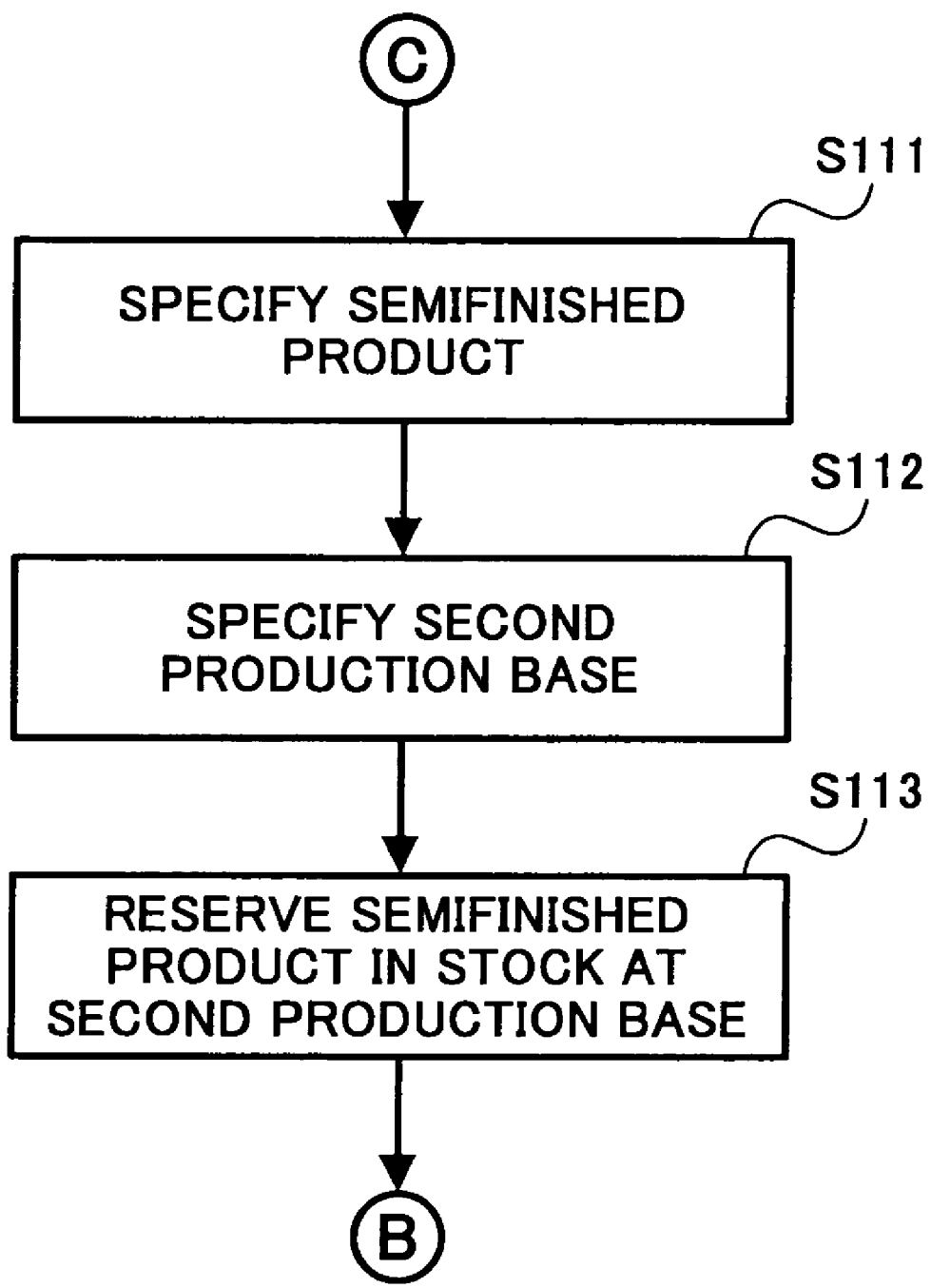

FIGS. 9A to 9C are flowcharts showing processing for reserving a product or semifinished product for an order from a sales company or client.

In the sales company, the terminal 35 transmits order data to the management computer 20 via the Internet 30 in response to an operation done by a person in charge. The terminal 36 transmits order data to the management computer 20 via the Internet 30 in response to a client's operation.

In the management computer 20, the receiving section 51 receives order data from the terminal 35 or 36 (step S101). An order identifier is allocated to each order data to be associated with each other. According to order data to which the order identifier is allocated, order information 230 is stored in the database 23 (step S102). At this time, the management computer 20 fetches first type information 241 from the database 24 based on a product identifier included in order data. A combination of a semifinished product and a part that are necessary for assembling a product is specified by first type information 241. This combination is designated by order information 230.

The management computer 20 obtains a shop identifier corresponding to the terminal 35 or 36 that has transmitted order data (step S103). For example, when order data is transmitted from the terminal 35, the management computer 20 obtains a shop identifier corresponding to the terminal 35 that has transmitted order data from shop information 250 stored in the database 25. While, when order data is transmitted from the terminal 36, the management computer 20 obtains a shop identifier of the shop belonging to the same consumption area as the delivery destination indicated by order data from shop information 250 stored in the database 25.

The management computer 20 transmits instruction data for delivering products to the terminal 35 set up at the shop designated by the shop identifier (step S104). In step S104, the management computer 20 may transmit instruction data for kitting products. Product-kitting is a process for creating a kit-assembled product. By kitting, a plurality of individual products is combined as one kit-assembled product. For example, in this product-kitting process, optional products that the client has desired are attached to the basic product. Instruction data for kitting and delivery includes data indicative of product identifier, product quantity, delivery date, delivery destination, etc. If instruction data for kitting and delivery reaches the terminal 35, the terminal 35 outputs information for kitting and delivery. At the shop, the product-kitting and delivery are executed according to information output from the terminal 35. In the management computer 20, shipment planning information on product is stored in a database (not shown) in response to transmission of instruction data for kitting and delivery. Shipment planning information on product includes various data such as "shop identifier", "product identifier", "product quantity", "delivery date", "delivery destination", "identifier of production base", "status", etc. When instruction data for kitting and delivery is transmitted from the management computer 20, data, which shows that the product has not yet shipped, is set to "status" of shipment planning information. When an ordered product is transported to the client from the first production base or shop, data showing that the shipment of product has completed is set to "status" of shipment planning information.

Figure 10A:
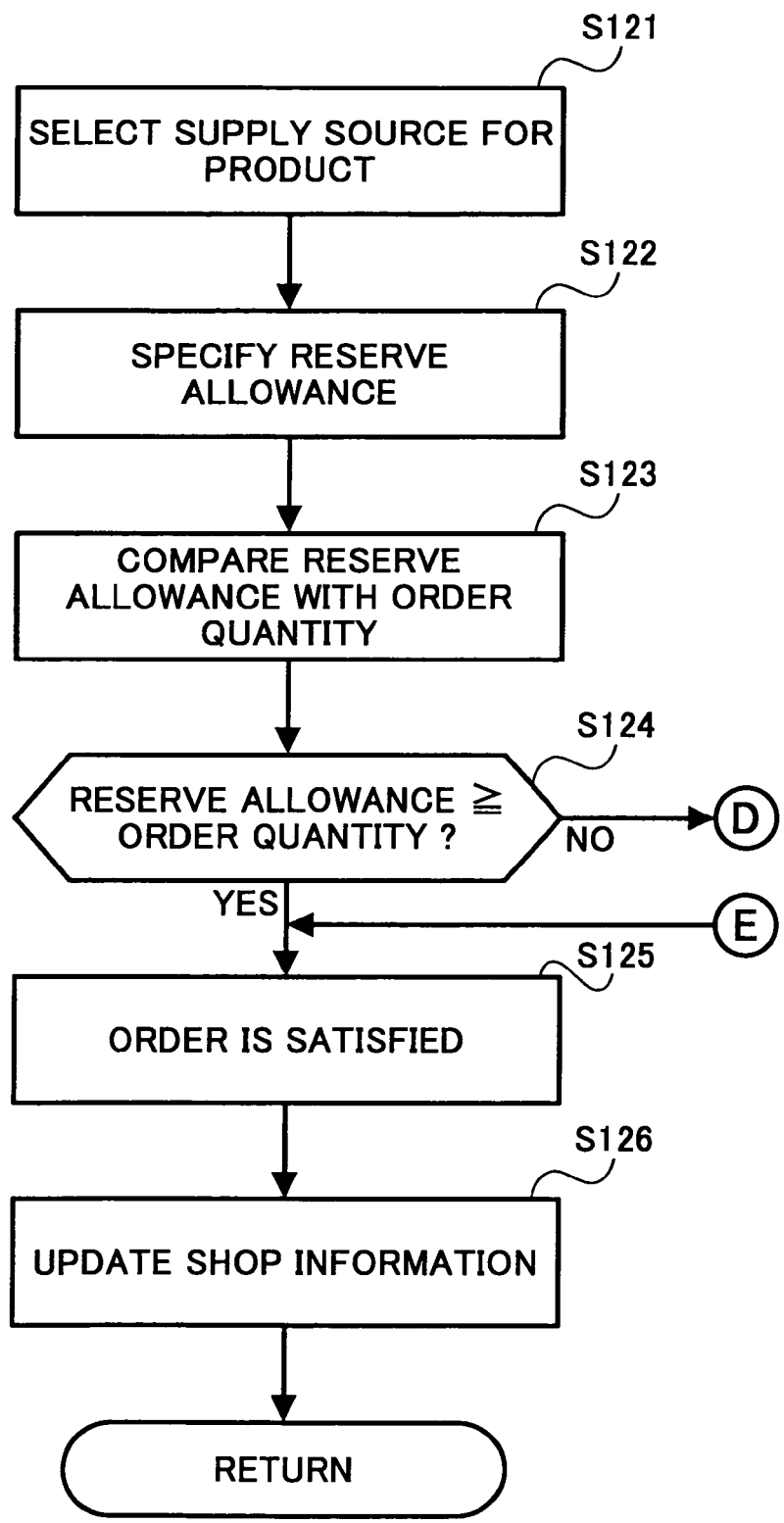
FIGS. 10A and 10B are flowcharts showing processing for reserving goods in store at a shop.
Figure 10B:
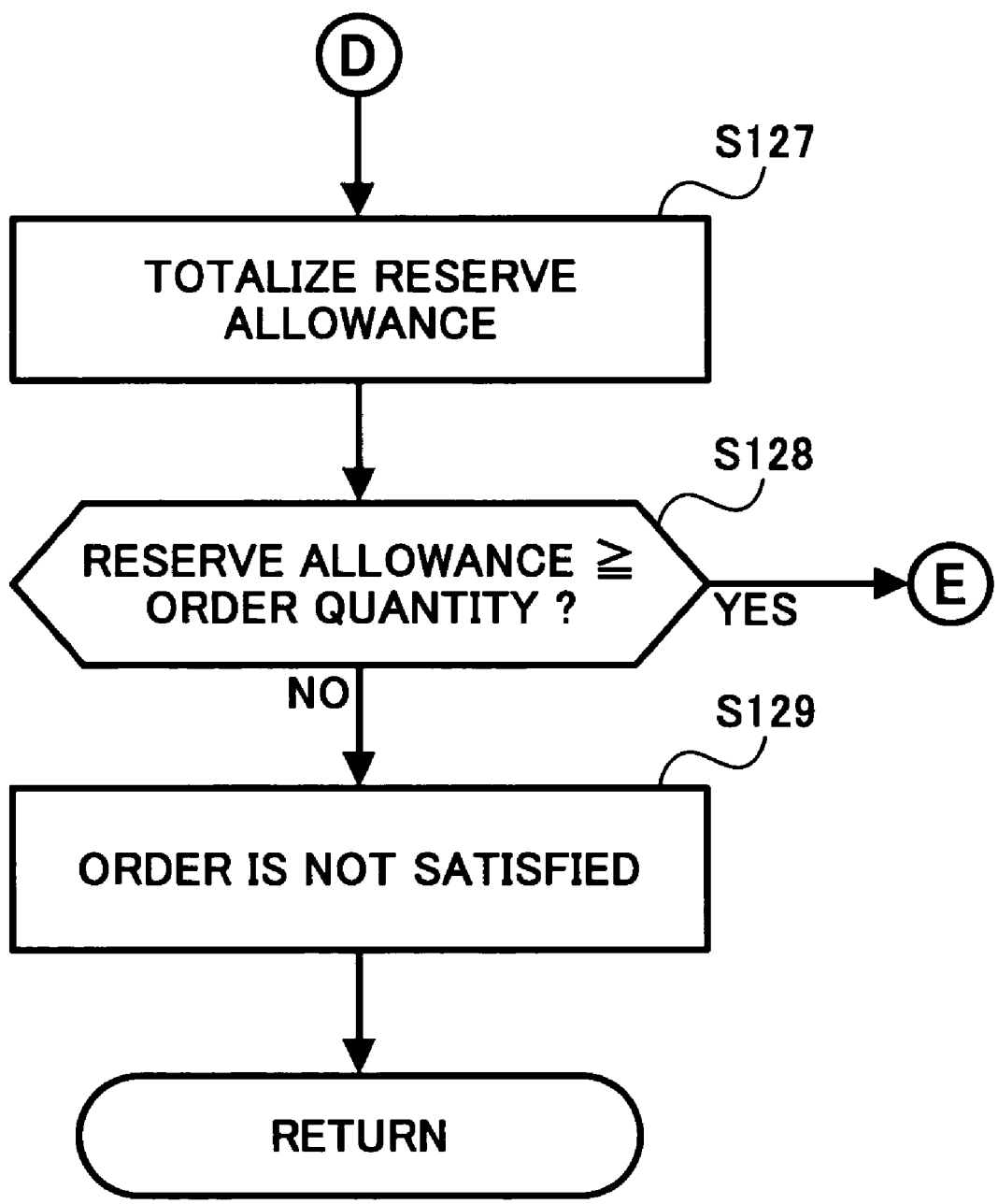

Subsequent to step S104, the management computer 20 executes processing shown in FIGS. 10A and 10B in order to reserve the product in stock at at least one of the plurality of shops for the order from the shop or client (step S105). FIGS. 10A and 10B are flowcharts specifically explaining processing of step S105 shown in FIG. 9A.

In FIG. 10A, the selection module 61 of determination processing section 52 selects a shop corresponding to the shop identifier obtained in step S103 as a product supply source (step S121). In step S121, a geographical position of the client to which the product is provided may be specified. The shop corresponding to the geographical position of client is selected as a product supply source by the selection module 61.

The determination module 62 of determination processing section 52 specifies the reserve allowance by referring to shop information 250 stored in the database 25 (step S122). In step S122, the reserve allowance is decided according to the shop identifier indicative of the product supply source and the product identifier of order information 230. The reserve allowance is compared with an order quantity specified from order information 230 (step S123). As a result of comparison, the determination module 62 determines whether the reserve allowance is greater than the order quantity (step S124). If the reserve allowance is greater than the order quantity, the order is satisfied (step S125). After step S125, the reserve processing section 54 updates shop information 250 in order to reserve goods in stock at the shop for the order from the shop or client (step S126). In step S126, the reserve processing section 54 decreases the reserve allowance included in shop information 250 in accordance with the quantity of product reserved this time. The reserve allowance is decreased in ascending order of date associated with shop information 250 on a priority basis.

While, if the reserve allowance is below the order quantity in step S124, the determination module 63 of determination processing section 52 executes processing for reserving the product in stock at the shops other than the supply source for the order from the shop or client. In this processing, the determination module 63 totalizes the reserve allowance at the shops other than the product supply source by referring to shop information 250 stored in the database 25 (step 127 shown in FIG. 10B). In order to total reserve allowance, the determination module 63 extracts shop information 250, which includes the same product identifier as the product identifier indicated by the order information 230, from the database 25. The reserve allowance included in the extracted shop information 250 is added up in ascending order of date pointed by shop information 250 until the total reaches the quantity of the ordered product. The determination module 63 determines whether the total of the reserve allowance is greater than the order quantity when reserve allowance of shop information 250 that indicates the current date is added. The determination module 63 further adds the reserve allowance of shop information 250 indicating a future date when the total of the reserve allowance is below the order quantity.

The determination module 63 determines whether the total of the reserve allowance is greater than the order quantity (step S128). If the total of the current or future reserve allowance is greater than the order quantity in step S128, the order is satisfied (step S125 shown in FIG. 10A). While, if the total of the current or future reserve allowance is below the order quantity in step S127, the order is not satisfied (step S129).

After step S126 shown in FIG. 10A or step S129 shown in FIG. 10B, the determination processing section 52 proceeds to processing of step S106 shown in FIG. 9B.

In step S106, the determination processing section 52 determines whether the order is satisfied. If the order is satisfied in step S106, the management computer 20 proceeds to processing of step S181 shown in FIG. 13.

While, if the order is not satisfied in step S106, the selection module 61 of the determination processing section 52 specifies at least one first production base that is located in the same consumption area as the shop corresponding to the shop identifier obtained in step S103 (step S107). In step S107, the module 61 obtains a production base identifier of the first production base from planning information 210 stored in the database 21.

The management computer 20 transmits instruction data for delivering products to the terminal 31 set up at the first production base designated by the production base identifier (step S108). In step S108, the management computer 20 may transmit instruction data for product-kitting. Instruction data for kitting and delivery includes data indicative of the product identifier, product quantity, delivery date, delivery destination, shop identifier, etc. If instruction data for kitting and delivery reaches the terminal 31, the terminal 31 outputs information for kitting and delivery. At the first production base, product-kitting and delivery are executed according to information output by the terminal 31. In the management computer 20, the aforementioned shipment planning information is updated in response to transmission of instruction data for kitting and delivery. In the update processing of shipment planning information, the production base identifier of the first production base specified in step S107 is set to shipment planning information.

Figure 11A:
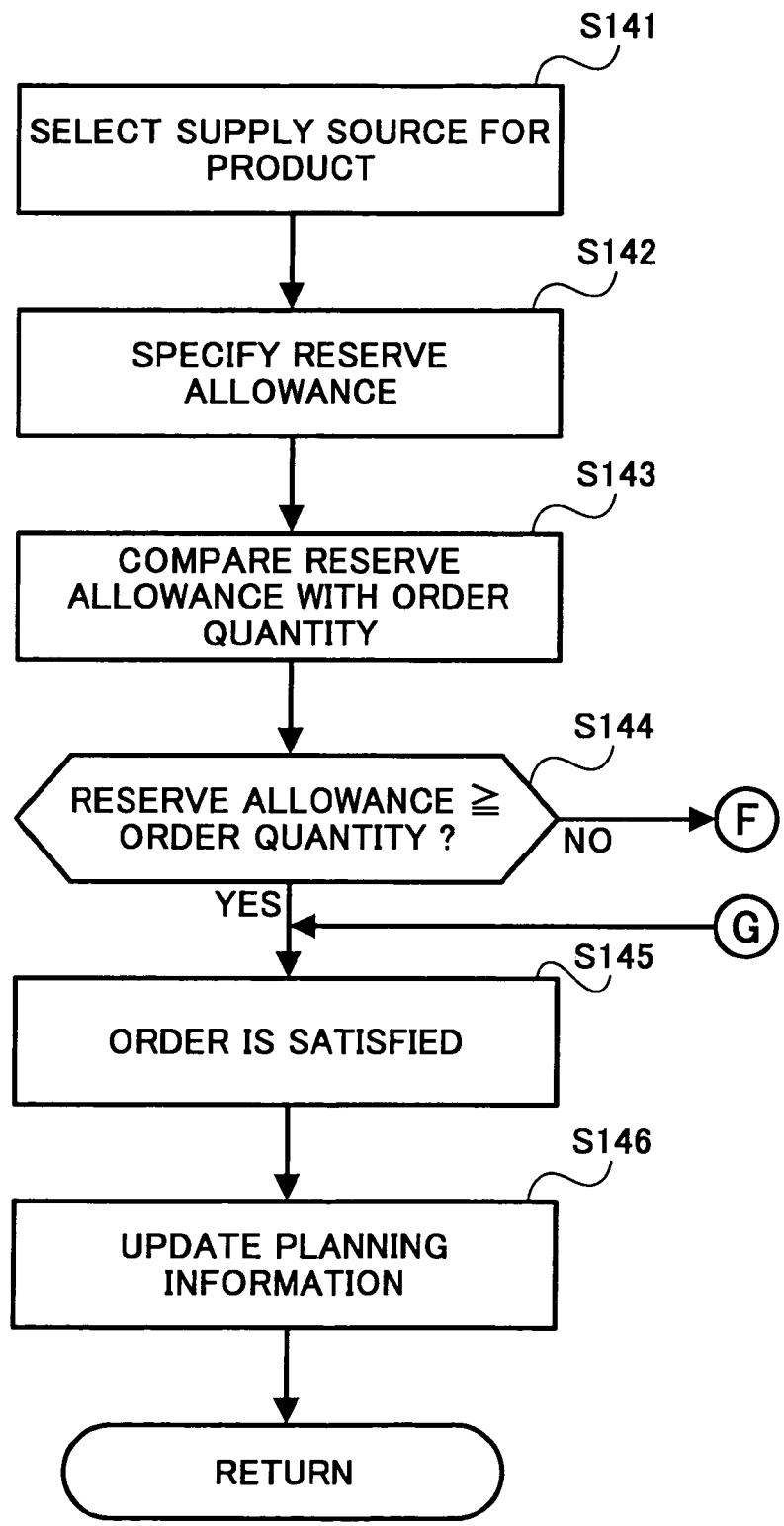
FIGS. 11A and 11B are flowcharts showing processing for reserving goods in store at a first production base.
Figure 11B:
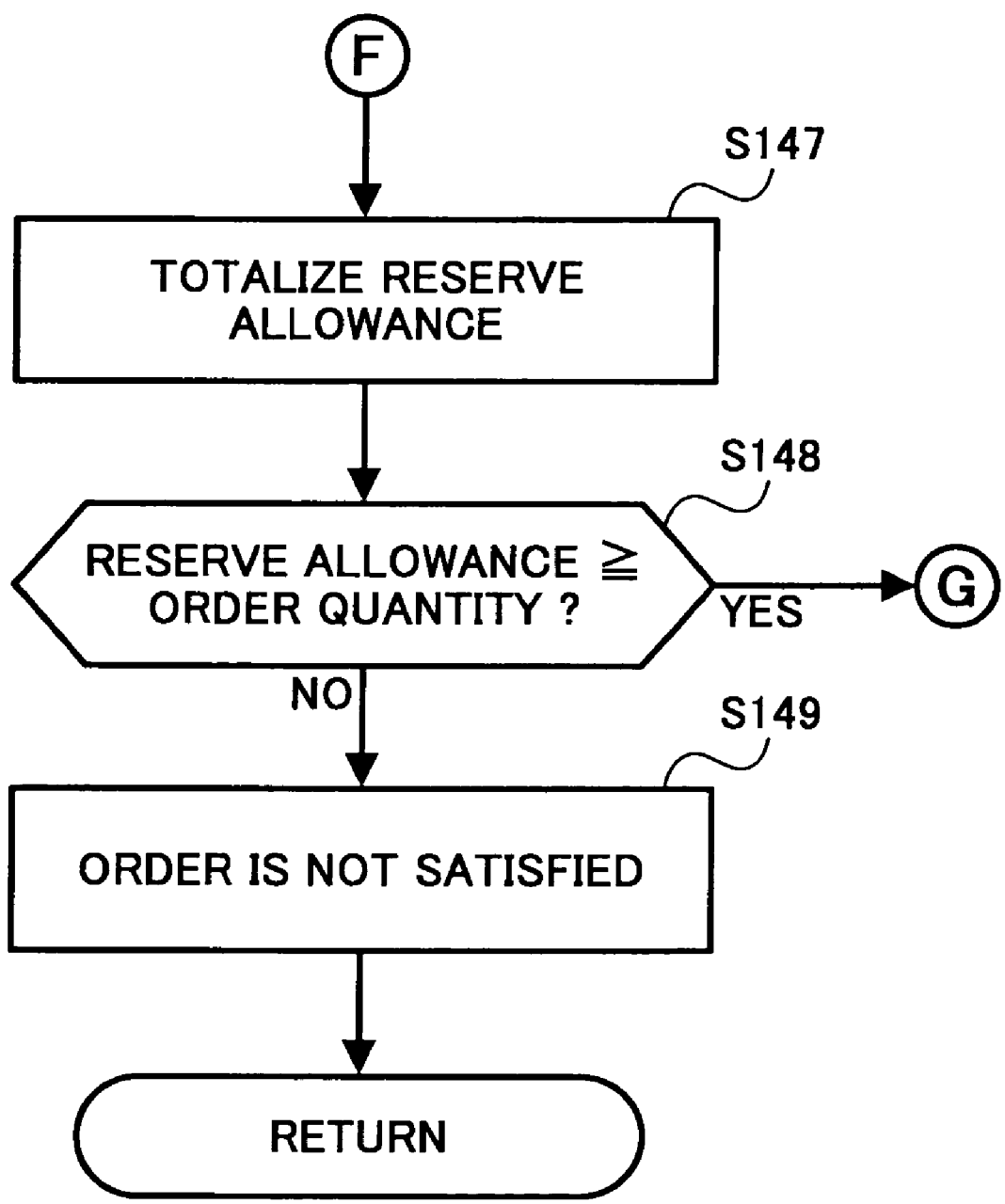

Subsequent to step S108, the management computer 20 executes processing shown in FIGS. 11A and 11B in order to reserve the product in stock at at least one of the plurality of first production bases for the order from the shop or client (step S109). FIGS. 11A and 11B are flowcharts that specifically explain processing of step S109 shown in FIG. 9B.

In FIG. 11A, the selection module 61 of determination processing section 52 selects the first production base specified in step S107 as a product supply source (step S141). In step S141, the selection module 61 may specify a geographical position of the shop to which the product is provided or a geographical position of the client. The first production base corresponding to the geographical position of the shop or the geographical position of the client is selected as a product supply source by the selection module 61.

The determination module 62 of determination processing section 52 specifies the reserve allowance by referring to planning information 210 stored in the database 21 (step S142). In step S142, the reserve allowance is decided to be associated with the production base identifier, indicative of the product supply source, and the product identifier of order information 230. In order to specify the reserve allowance, the determination module 62 extracts planning information 210, which includes the production base identifier corresponding to the supply source and the product identifier indicated by order information 230, from the database 21. The reserve allowance included in the extracted planning information 210 is added up in ascending order of date pointed by planning information 210 until the total reaches the quantity of the ordered product. The determination module 62 determines whether the total of the reserve allowance is greater than the order quantity when the reserve allowance of planning information 210, which indicates the same date as the delivery date indicated by order information 230, is added. The determination module 62 further adds the reserve allowance of planning information 210 indicating a future date when the total of the reserve allowance is below the order quantity.

The reserve allowance specified in step S142 is compared with the order quantity indicated by order information 230 (step S143). As a result of comparison, the determination module 62 determines whether the reserve allowance is greater than the order quantity (step S144). If the reserve allowance is greater than the order quantity in step S144, the order is satisfied (step S145). After step S145, the reserve processing section 54 updates planning information 210 in order to reserve the product in stock at the first production base for the order from the shop or client (step S146). In step S146, the reverse allowance processing section 54 reduces the reserve allowance included in planning information 210 according to the quantity of the product reserved this time. The reserve allowance is reduced in ascending order of date associated with planning information 210 on a priority basis. In step S146, the reserve processing section 54 may reduce the reserve allowance included in shop information 250 in accordance with the quantity of the product reserved this time. By updating planning information 210, it is assured that the product manufactured at the first production base is provided to the shop or client.

While, if the reserve allowance is below the order quantity in step S144, the determination module 63 of determination processing section 52 executes processing for reserving the product in stock at the first production bases other than the supply source for the order from the shop or client. In this processing, the determination module 63 totalizes the reserve allowance at the production bases other than the product supply source by referring to planning information 210 stored in the database 21 (step S147 shown in FIG. 11B). These first production bases are located, for example, in the consumption area adjacent to the consumption area where shop corresponding to the shop identifier obtained in step 103 is located.

The determination module 63 determines whether the total of reserve allowance is greater than the order quantity (step S148). If the total of reserve allowance is greater than the order quantity in step S148, the order is satisfied (step S145 shown in FIG. 11A). While, if the total of reserve allowance is below the order quantity in step S148, the order is not satisfied (step S149).

After step S146 shown in FIG. 1A and step S149 shown in FIG. 11B, the management computer 20 proceeds to processing of step S110 shown in FIG. 9B.

In step S110, the determination processing section 52 determines whether the order is satisfied. If the order is satisfied in step S110, the management computer 20 proceeds to processing of step S181 shown in FIG. 13.

While, if the order is not satisfied in step S110, the determination processing section 53 of management computer 20 specifies a semifinished product necessary for manufacturing the ordered product according to combination indicated by order information 230 (step S111 shown in FIG. 9C). The selection module 61 of determination processing section 53 specifies a second production base for manufacturing the semifinished product specified in step S111 by referring to planning information 220 stored in the database 22 (step S112). In step S112, the selection module 61 obtains a production base identifier of the second production base from planning information 220.

Figure 12A:
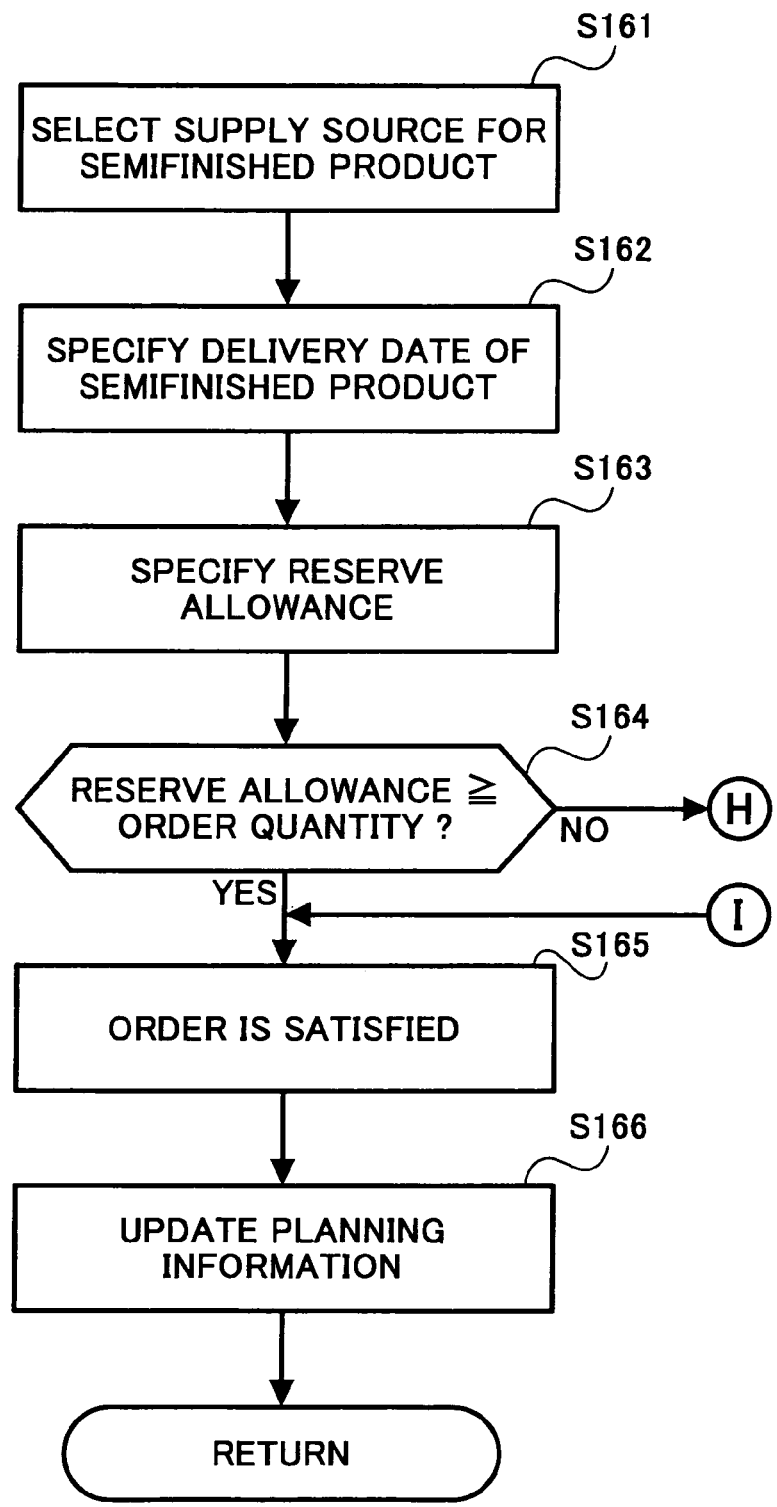
FIGS. 12A and 12B are flowcharts showing processing for reserving semifinished products in store at a second production base.
Figure 12B:
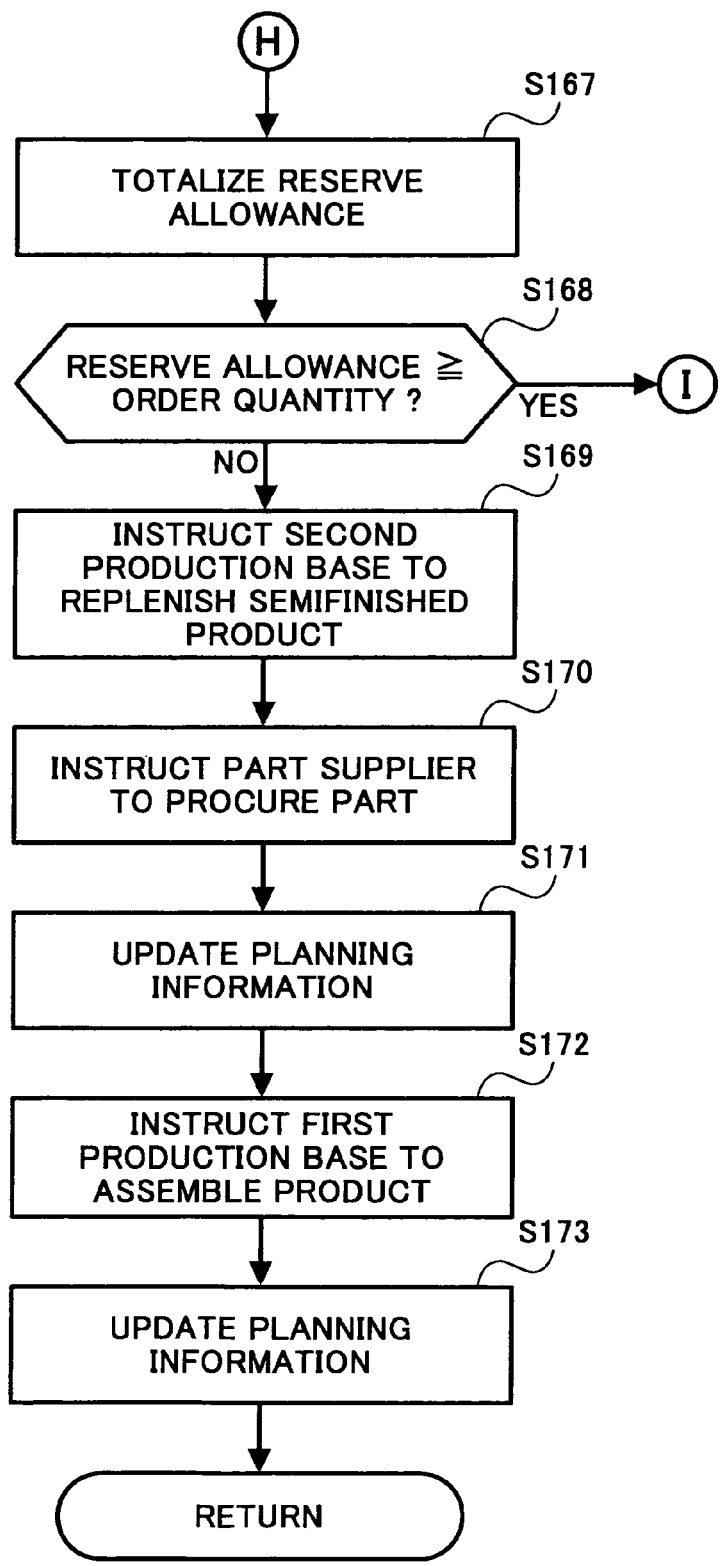

Subsequent to step S112, the management computer 20 executes processing shown in FIGS. 12A and 12B in order to reserve the semifinished product for the order from the shop or client (step S113). FIGS. 12A and 12B are flowcharts to specifically explain processing in step S113 shown in FIG. 9C.

In FIG. 12A, the selection module 61 of determination processing section 53 selects the second production base specified in step S112 as a semifinished product supply source (step S161). In step S161, a geographical position of the shop to which the product is provided or a geographical position of the client may be specified. The second production base corresponding to the geographical position of the shop or client is selected as a semifinished product supply source by the selection module 61.

The determination module 62 of determination processing section 53 specifies the delivery date of the semifinished product by subtracting days required for assembling the product and days required for transporting the semifinished product from the second production base to the first production base from the delivery date indicated by order information 230 (step S162).

The determination module 62 specifies the reserve allowance by referring to planning information 220 stored in the database 22 (step S163). In step S163, the reserve allowance is decided according to the semifinished product specified in step S111, second production base selected in step S161 and the delivery date of the semifinished product specified in step S162. In order to specify the reserve allowance, the determination module 62 extracts planning information 220 from the database 22. Planning information 220 extracted by the determination module 62 includes the production base identifier, indicative of the semifinished product supply source, the semifinished product identifier shown by the combination of order information 230, and date prior to the delivery date specified in step S162. The reserve allowance included in planning information 220 is added up in ascending order of date pointed by planning information 220 until the total reaches the quantity necessary for manufacturing the ordered product (hereinafter referred to as "necessary quantity"). The determination module 62 determines whether the total of the reserve allowance is greater than the necessary quantity when the reserve allowance of planning information 220 that indicates the current date is added. The determination module 62 further adds the reserve allowance of planning information 220 indicating a future date when the total of the reserve allowance is below the necessary quantity. The reserve allowance to be added in this processing is limited to one that corresponds to the date prior to the delivery date specified in step S162.

The determination module 62 determines whether the reserve allowance on the semifinished product is greater than the necessary quantity (step S164). If the current or future reserve allowance is greater than the necessary quantity in step S164, the order is satisfied (step S165). After step S165, the reserve processing section 55 updates planning information 220 in order to reserve the semifinished product manufactured at the second production base for the order from the shop or client (step S166). In step S166, the reserve processing section 55 decreases the reserve allowance included in planning information 220 in accordance with the quantity of semifinished product reserved this time. The reserve allowance is decreased in ascending order of date associated with planning information 220 on a priority basis.

While, if the reserve allowance is less than the necessary quantity in step S164, the determination module 63 of determination processing section 53 executes processing for reserving the semifinished product manufactured at the second production bases other than the supply source for the order from the shop or client. In this processing, the determination module 63 totalizes the reserve allowance at the second production bases other than the semifinished product supply source by referring to planning information 220 stored in the database 22 (step S167 shown in FIG. 12B). These second production bases are located near, for example, the semifinished product supply source selected in step S161.

The determination module 63 determines whether the total of the reserve allowance is greater than the order quantity (step S168). If the total of the reserve allowance is greater than the order quantity in step S168, the order is satisfied (step S165 shown in FIG. 12A). While, if the total of the reserve allowance is below the order quantity in step S168, the management computer 20 transmits instruction data for replenishment of semifinished product to the terminal 32 set up at the second production base selected as the semifinished product supply source in step S161 (step S169). Instruction data on replenishment of semifinished product includes data indicative of semifinished product identifier, quantity of semifinished product, delivery date, first production base as a transport destination for semifinished product, etc. When instruction data on replenishment of semifinished product is transmitted from the management computer 20, data, which indicates that the semifinished product has not yet replenished, is set to "status" of shipment planning information. When the designated semifinished product is transported from the second production base to the first production base, data, which indicates that replenishment of the semifinished product is completed, is set to "status" of shipment planning information.

Further, the management computer 20 transmits instruction data for procurement of parts to the terminal 34 set up to the part supplier positioned at the production area (step S170). This instruction data for procurement of parts includes data indicative of part identifier, part quantity, delivery date, second production base as a part transport destination, etc. If instruction data for procurement reaches the terminal 34, the terminal 34 outputs information for procuring the parts. At the part supplier side, the parts that are required for procurement are manufactured according to information output from the terminal 34.

After step S170, the reserve processing section 55 updates planning information 220 in order to reserve the semifinished product in stock at the second production base for the order from the shop or client (step S171). In step S171, the reserve processing section 55 decreases the reserve allowance included in planning information 220 in accordance with the quantity of semifinished product reserved this time. The reserve allowance is decreased in ascending order of date associated with planning information 220 on a priority basis.

Subsequent to step S171, the management computer 20 transmits instruction data for product-assembly to the terminal 31 set up at the first production base (step S172). In step S172, the management computer 20 may transmit instruction data for product-kitting. The instruction data for product-kitting includes data indicative of product identifier, product quantity, delivery date, delivery destination, etc. If instruction data for kitting and assembling reaches the terminal 31, the terminal 31 outputs information for kitting and assembling. At the first production base, kitting and assembling for a product are executed in accordance with information output from the terminal 31.

In addition to the semifinished product, dedicated parts necessary for assembling the product are supplied from the part supplier located at the same consumption area as the first production base. In order to procure the dedicated parts, the management computer 20 transmits instruction data for procurement of the parts. This instruction data for procurement includes data indicative of part identifier, part quantity, delivery date, first production base as a part transport destination, etc. If this instruction data for procurement reaches the terminal 33, the terminal 33 outputs information for procuring the parts. At the part supplier side, the parts that are required for procurement are manufactured according to information output from the terminal 33.

After step S172, the reserve processing section 54 updates planning information 210 in order to reserve goods to be stocked in the first production base for the order from the shop or client (step S173). In step S173, the reserve processing section 54 creates planning information 210 indicating the quantity of product reserved this time. The created planning information 210 is stored in the database 21.

The management computer 20 may try to reserve the semifinished product in stock at the first production base before reserving the semifinished product in stock at the second production base for the order from the shop or client. In order to manage the stock of the semifinished product at the first production base, planning information 210 may include data indicative of the stock volume of semifinished product. In this case, the determination processing section 53 checks the stock of semifinished product at the first production base before the semifinished product manufactured at the second production base for the order from the shop or client is reserved. If the determination processing section 53 determines that the semifinished product stocked in the first production base can be reserved, the reserve processing section 55 updates planning information 210.

Figure 13:
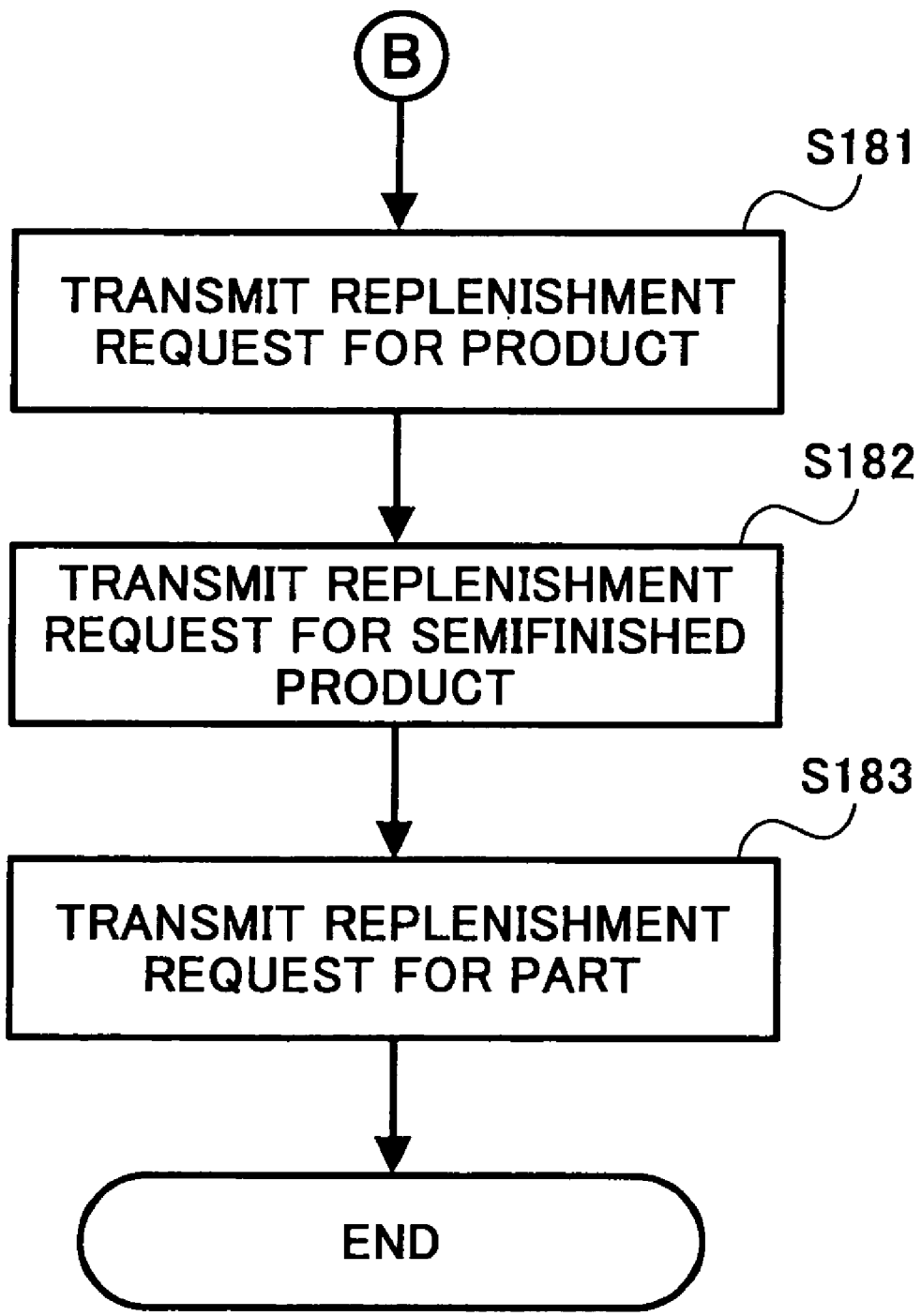
FIG. 13 is a flowchart showing processing for transmitting a replenishment request for product, semifinished product, or part.

After step S166 shown in FIG. 12A or step S173 shown in FIG. 12B, the management computer 20 proceeds to processing of step S181 shown in FIG. 13. FIG. 13 is a flowchart showing processing for replenishing the delivered product, semifinished product, and part.

In the management computer 20, the transmitting section 56 transmits a replenishment request for product corresponding to the quantity of sold products to the terminal 31 set up at the first production base (step S181). In step S181, the management computer 20 compares the stock volume of product at at least one shop specified by shop information 250 with a predetermined threshold value. When the stock volume of product is below the threshold value, the transmitting section 56 transmits the replenishment request for product to the terminal 31. The first production base can replenish the product to the shop in response to the reception of the replenishment request for product from the management computer 20.

The transmitting section 57 of the management computer 20 transmits a replenishment request for semifinished product corresponding to the requested product in step S181 to the terminal 32 set up at the second production base (step S182). In step S182, the management computer 20 specifies the semifinished product necessary for assembling the products based on first type information 241 included in design information 240. The second production base can replenish the semifinished product to the first production base in response to the reception of the replenishment request for semifinished product from the management computer 20.

The transmitting section 58 of the management computer 20 transmits a replenishment request for part corresponding to the requested semifinished product in step S182 to the terminal 34 set up at the part supplier located at the production area (step S183). In step S183, the management computer 20 specifies the part necessary for manufacturing the semifinished product based on second type information 242 included in design information 240. The part supplier can replenish the part to the second production base in response to the reception of the replenishment request for part from the management computer 20.

The management computer 20 transmits instruction data on product-kitting, delivery, and production to the terminal 31 set up at the first production base. A recipient of this instruction data is decided according to the delivery destination indicated by order data (supply request for product) transmitted from the terminal 35 set up at the shop or the terminal 36 used by the client. Accordingly, the first production base close to the destination where the product is delivered is automatically selected as a recipient for instruction data. The transport cost of product can be thus reduced.

When the product in stock at one shop cannot cover all orders, the product in stock at another shop can be reserved for the orders. Moreover, when the product in stock at another shop cannot cover all orders, the product in stock at the first production base can be reserved for the orders. In the product in stock at the first production base, a virtual stock of the product to be assembled in the future is included. The product for the order can be speedily provided.

When the product in stock at the first production base cannot cover all orders, the semifinished product in stock at the second production base can be reserved for the orders. In the semifinished product in stock at the second production base, a virtual stock of the semifinished product to be manufactured in the future is included. In this way, lead time that is required before the product is provided can be reduced. In addition, the stock of product at the shop and the first production base can be reduced. The semifinished product used in common between the plurality of kinds of products can be manufactured with a high degree of efficiency at the second production base.

The second production base that replenishes the semifinished product to the first production base is located at the same production area as the part supplier. Accordingly, the final product is assembled at the first production base located at the consumption area, while the semifinished product is manufactured at the second production base located at the production area. Accordingly, the cost that is required for procurement of parts can be reduced. In addition, the size of semifinished product is smaller than that of the product. Accordingly, the transport cost of the product can be reduced.

The replenishment requests for product, semifinished product, part, which correspond to the quantity of sold products, are automatically transmitted from the management computer 20. Accordingly, period of time that is required for replenishment of product is reduced. In addition, the stocks of product, semifinished product, part can be reduced.

The semifinished product necessary for assembling the product is managed by first type information 241 included in design information 240. The part necessary for manufacturing the semifinished product is managed by second type information 240 included in design information 240. Accordingly, even if the design of the product or semifinished product is changed, the replenishment requests for product, semifinished product and part can be appropriately transmitted.

The terminals 31 to 36 can gain access to information stored in the databases 21 to 25 via the Internet 30. Accordingly, appropriate information can be efficiently provided.

This invention can be implemented by a general computer without limiting to the dedicated system. A program and data for controlling the computer to execute the aforementioned processing may be distributed onto a storage medium (magnetic recording device, optical recording device, magneto-optical recording, IC memory, etc.). The program is installed onto the computer, and the computer executes the aforementioned processing on an OS (operating System) so as to achieve this invention. The aforementioned program and data may be stored in a disk device provided in a server on the Internet, and superimposed on a carrier wave. The program and data superimposed on the carrier wave are downloaded onto the computer so as to implement the system of this invention.

The system of this invention may be applied to a case that an arbitrary product other than the electronic equipment is assembled using a semifinished product.

The connection between the management computer 20 and each of the terminals 31 to 37 may be established by electrical communication networks (e.g., circuit switched public data network, intranet, extranet, and so on) other than the Internet 30.

The databases 21 to 25 may be provided on one storage or they may be dispersedly provided on a plurality of storages.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2001-392669 filed on Dec. 25, 2001 and including specification, claims, drawings and summary. The disclosure of the above Japanese Patent Application is incorporated herein by reference in its entirety.

What is claimed is:

1. A system for managing product reserve, comprising:
a plurality of first terminals associated with a plurality of first production bases configured to assemble a plurality of products, each of which is assembled using more than one of a plurality of semifinished products;
a plurality of second terminals associated with a plurality of second production bases configured to manufacture the plurality of semifinished products;
a plurality of third terminals associated with a plurality of shops;
a management computer connected to the plurality of first, second and third terminals via a network; and
first, second and third databases connected to the management computer, wherein:
the first database stores product stock information associated with at least one kind of the plurality of products;
the second database stores semifinished product stock information associated with at least one kind of the plurality of semifinished products that can be used in common between all or a part of the plurality of products;
the third database stores order information indicating at least one order set from at least one of the plurality of shops or at least one client;
the product stock information stored in the first database includes a first type of stock information associated with the plurality of products in stock at the plurality of shops, and a second type of stock information associated with the plurality of products in stock at the plurality of first production bases;

the semifinished product stock information stored in the second database includes a third type of stock information associated with the plurality of semifinished products in stock at the plurality of first production bases, and a fourth type of stock information associated with the plurality of semifinished products in stock at the plurality of second production bases, wherein the management computer comprises:

a request receiving section that receives a supply request for one or more of the plurality of products sent from at least one of the plurality of third terminals;

a first determination processing section that, in response to the supply request received by the request receiving section, firstly determines whether the one or more of the plurality of products in stock at the plurality of shops can be reserved based on the first type of stock information and secondly determines, when determination is made that the reserve based on the first type of stock information is inadequate, whether the one or more of the plurality of products in stock at the plurality of first production bases can be reserved based on the second type of stock information;

a first reserve processing section that reserves the one or more of the plurality of products when the first determination processing section determines that the one or more of the plurality of products can be reserved;

a second determination processing section that, in response to the supply request received by the request receiving section, thirdly determines, when a determination is made that the reserve based on the second type of stock information is inadequate, whether one or more of the plurality of semifinished products in stock at the plurality of first production bases can be reserved based on the third type of stock information and fourthly determines, when a determination is made that the reserve based on the third type of stock information is inadequate, whether one or more of the plurality of semifinished products in stock at the plurality of second production bases can be reserved based on the fourth type of stock information; and a second reserve processing section that reserves the one or more of the plurality of semifinished products when the second determination processing section determines that the one or more of the plurality of semifinished products can be reserved, wherein the management computer:

updates the order information stored in the third database when the request receiving section receives the supply request, and transmits first instruction data for kitting and delivering the one or more of the plurality of products to at least one of the plurality of third terminals when the first determination processing section determines that the one or more of the plurality of products can be reserved based on the first type of stock information:

transmits second instruction data for kitting and delivering the one or more of the plurality of products to at least one of the plurality of first terminals when the first determination processing section determines that the reserve based on the first type of stock information is inadequate; and transmits at least one replenishment request for the one or more of the plurality of semifinished products to at least one of the plurality of second terminals when the second determination processing section determines that the reserve based on the third type of stock information is inadequate.

2. The system according to claim 1, wherein each of the first and second types of stock information stored in said first database includes current product information associated with the plurality of products in current stock and future product information associated with the plurality of products in future stock, said first determination processing section determines whether the one or more of the plurality of products can be reserved in response to the supply request received by said request receiving section based on the current product information, and determines whether the one or more of the plurality of products can be reserved in response to the supply request received by said request receiving section based on the future product information when said first determination processing section determines that the reserve based on the current product information is inadequate, and said first reserve processing section reserves the one or more of the plurality of products in response to the supply request received by said request receiving section when said first determination processing section determines that the one or more of the plurality of products can be reserved based on the current product information or the future product information.

3. The system according to claim 1, wherein each of the third and fourth types of stock information stored in said second database includes current semifinished product information associated with the plurality of semifinished products in current stock and future semifinished product information associated with the plurality of semifinished products in future stock, said second determination processing section determines whether the one or more of the plurality of semifinished products can be reserved in response to the supply request received by said request receiving section based on the current semifinished product information, and determines whether the one or more of the plurality of semifinished products can be reserved in response to the supply request received by said request receiving section based on the future semifinished product information when said second determination processing section determines that the reserve based on the current semifinished products is inadequate, and said second reserve processing section reserves the one or more of the plurality of semifinished products in response to the supply request received by said request receiving section when said second determination processing section determines that the one or more of the plurality of products can be reserved based on the current semifinished product information or the future semifinished product information.

4. The system according to claim 1, wherein product stock information stored in said first database includes a first type of stock information indicating a stock of product at each of a plurality of production bases and a second type of stock information indicating a stock of product at each of plurality of shops, and said first determination processing section includes a selection section that selects at least one of said plurality of production bases and said plurality of shops as a supply source for the product designated by the request received by said request receiving section, a third determination processing section that determines whether the product in stock at the supply source selected by said selection section can be reserved in response to the request received by said request receiving section based on the first type or second type of stock information stored in said first database, and a fourth determination processing section that determines whether the product in stock at another production base or another shop indicated in first type or second type stock information can be reserved when said third determination processing section determines that reserve of the product is inadequate, and said first reserve processing section reserves the product in response to the request received by said request receiving section when said third or fourth determination processing section determines that the product can be reserved.

5. The system according to claim 4, wherein said selection section specifies a shop geographical position or a client geographical position where the product is provided, and selects a supply source for the product corresponding to the specified position.

6. The system according to claim 1, wherein semifinished product stock information stored in said second database includes a first type of stock information indicating a stock of semifinished product at each of a plurality of first production bases suitable for the production of semifinished product and a second type of stock information indicating a stock of semifinished product at each of a plurality of second production bases suitable for the production of final product, and said second determination processing section includes a selection section that selects at least one of said plurality of first and second production bases as a supply source for the semifinished product corresponding to the request received by said request receiving section, a third determination processing section that determines whether the semifinished product in stock at the supply source selected by said selection section can be reserved in response to the request received by said request receiving section based on the first type or second type of stock information stored in said second database, and a fourth determination processing section that determines whether the semifinished product in stock at another production base indicated in first type or second type stock information can be reserved when said third determination processing section determines that reserve of the semifinished product is inadequate, and said second reserve processing section reserves the semifinished product in response to the request received by said request receiving section when said third or fourth determination processing section determines that the semifinished product can be reserved.

7. The system according to claim 6, wherein said selection section specifies a shop geographical position or a client geographical position where the product is provided, and selects a supply source for the semifinished product corresponding to the specified position.

8. The system according to claim 1 further comprising:
a plurality of fourth terminals each of which is set up at each of a plurality of supply sources for a plurality of parts for manufacturing at least one of the plurality of semifinished products;
wherein the management computer transmits at least one procurement request for one or more of the plurality of parts to at least one of the plurality of fourth terminals when the second determination processing section determines that the reserve based on the third and fourth types of stock information is inadequate.

9. The system according to claim 8, wherein
the management computer
generates the second type of stock information to be stored in the first database according to an assembly plan of each of the plurality of products, and
generates the fourth type of stock information to be stored in the second database according to a production plan of each of the plurality of semifinished products, the first reserve processing section
updates the first type of stock information stored in the first database when the first determination processing section determines that the one or more of the plurality of products can be reserved based on the first type of stock information, and
updates the second type of stock information stored in the first database when the first determination processing section determines that the one or more of the plurality of products can be reserved based on the second type of stock information, and
the second reserve processing section
updates the third type of stock information stored in the second database when the second determination processing section determines that the one or more of the plurality of semifinished products can be reserved based on the third type of stock information, and
updates the fourth type of stock information stored in the second database when the second determination processing section determines that the one or more of the plurality of semifinished products can be reserved based on the fourth type of stock information.

10. A method for managing product reserve, comprising the steps of:
storing product stock information associated with at least one kind of a plurality of products in a first database, the product stock information including a first type of stock information associated with the plurality of products in stock at a plurality of shops and a second type of stock information associated with the plurality of products in stock at a plurality of first production bases configured to assemble the plurality of products, each of which is assembled using more than one of a plurality of semifinished products;
storing semifinished product stock information associated with at least one kind of the plurality of semifinished products that can be used in common between all or a part of the plurality of products in second database, the semifinished product stock information including a third type of stock information associated with the plurality of semifinished products in stock at the plurality of first production bases and a fourth type of stock information associated with the plurality of semifinished products in stock at a plurality of second production bases configured to manufacture the plurality of semifinished products;
providing each of a plurality of first terminals at each of the plurality of first production bases;
providing each of a plurality of second terminals at each of the plurality of second production bases;
providing each of a plurality of third terminals at each of the plurality of shops;
storing order information indicating at least one order sent from at least one of the plurality of shops or at least one client in a third database;
receiving, by a management computer, a supply request for one or more of the plurality of products from at least one of the plurality of third terminals each of which is set up at each of the plurality of shops;
determining, by the management computer, in response to the supply request, whether the one or more of the plurality of products in stock at the plurality of shops can be reserved in response to the supply request based on the first type of stock information;
determining, by the management computer, whether the one or more of the plurality of products in stock at the plurality of first production bases can be reserved based on the second type of stock information when a determination is made that the reserve based on the first type of stock information is inadequate;

reserving, by the management computer, the one or more of the plurality of products in response to the supply request when a determination is made that the one or more of the plurality of products can be reserved based on the first or second types of stock information;

determining, by the management computer, whether one or more of the plurality of semifinished products in stock at the plurality of first production bases for production of the one or more of the plurality of products can be reserved in response to the supply request based on the third type of stock information when a determination is made that the reserve based on the first and second types of stock information is inadequate;

determining, by the management computer, whether the one or more of the plurality of semifinished products in stock at the plurality of second production bases can be reserved based on the fourth type of stock information when a determination is made that the reserve based on the third type of stock information is inadequate;

reserving, by the management computer, the one or more of the plurality of semifinished products in response to the supply request when a determination is made that the one or more of the plurality of semifinished products can be reserved based on the third or fourth types of stock information;

updating, by the management computer, the order information stored in the third database when the supply request is received;

transmitting, by the management computer, first instruction data for kitting and delivering the one or more of the plurality of products to at least one of the plurality of third terminals when a determination is made that the one or more of the plurality of products can be reserved based on the first type of stock information;

transmitting, by the management computer, second instruction data for kitting and delivering the one or more of the plurality of products to at least one of the plurality of first terminals when a determination is made that the reserve based on the first type of stock information is inadequate; and transmitting, by the management computer, at least one replenishment request for the one or more of the plurality of semifinished products to at least one of the plurality of second terminals when a determination is made that the reserve based on the third type of stock information is inadequate.

11. The method according to claim 10, further comprising the steps of:

configuring each of the first and second types of stock information to include current product information associated with the plurality of products in current stock and future product information associated with the plurality of products in future stock;

determining, by the management computer, whether the one or more of the plurality of products can be reserved in response to the supply request based on the current product information;

determining, by the management computer, whether the one or more of the plurality of products can be reserved in response to the supply request based on the future product information when a determination is made that the reserve based on the current product information is inadequate; and reserving, by the management computer, the one or more of the plurality of products in response to the supply request when a determination is made that the one or more of the plurality of products can be reserved based on the current product information or the future product information.

12. The method according to claim 10, further comprising the steps of:

configuring each of the third and fourth types of stock information to include current semifinished product information associated with the plurality of semifinished products in current stock and future semifinished product information associated with the plurality of semifinished products in future stock;

determining, by the management computer, whether the one or more of the plurality of semifinished products can be reserved in response to the supply request based on the current semifinished product information stored in said second database;

determining, by the management computer, whether the one or more of the plurality of semifinished products can be reserved in response to the supply request based on the future semifinished product information when a determination is made that the reserve based on the current semifinished product information is inadequate; and reserving, by the management computer, the one or more of the plurality of semifinished products in response to the supply request when a determination is made that the one or more of the plurality of semifinished products can be reserved based on the current semifinished product information or the future semifinished product information.

13. The method according to claim 10, further comprising the steps of: storing a first type of stock information indicating a stock of product at each of a plurality of production bases and a second type of stock information indicating a stock of product at each of a plurality of shops to said first database; selecting at least one of said plurality of production bases and said plurality of shops as a supply source for the product designated by the supply request; determining whether the product in stock at the selected supply source can be reserved in response to the supply request received based on the first type or second type of stock information stored in said first database; determining whether the product in stock at another production base or another shop indicated in first type or second type stock information can be reserved when it is determined that reserve of the product is inadequate; and reserving the product in response to the supply request when it is determined that the product in stock at at least one of the plurality of production bases and the plurality of shops can be reserved.

14. The method according to claim 13, further comprising the steps of: specifying a shop geographical position or a client geographical position where the product is provided; and selecting a supply source for the product corresponding to the specified position.

15. The method according to claim 10, further comprising the steps of: storing a first type of stock information indicating a stock of semifinished product at each of a plurality of first production bases suitable for the production of semifinished product and a second type of stock information indicating a stock of semifinished product at each of a plurality of second production bases suitable for the production of final product to said second database; selecting at least one of said plurality of first and second production bases as a supply source for the semifinished product corresponding to the supply request;

determining whether the semifinished product in stock at the selected supply source can be reserved in response to the supply request based on the first type or second type of stock information stored in said second database; determining whether the semifinished product in stock at another production base indicated in first type or second type stock information can be reserved when it is determined that reserve of the semifinished product is inadequate; and reserving the semifinished product in response to the supply request when it is determined that the semifinished product in stock at at least one of the plurality of first and second production bases can be reserved.

16. The method according to claim 15, further comprising the steps of: specifying a shop geographical position or a client geographical position where the product is provided; and selecting a supply source for the semifinished product corresponding to the specified position.

17. The method according to claim 10, further comprising the steps of:
   providing each of a plurality of fourth terminals at each of a plurality of supply sources for a plurality of parts for manufacturing at least one of the plurality of semifinished products; and
   transmitting, by the management computer, at least one procurement request for one or more of the plurality of parts to at least one of the plurality of fourth terminals when a determination is made that the reserve based on the third and fourth types of stock information is inadequate.

18. The method according to claim 17, wherein
   generating the second type of stock information according to an assembly plan of each of the plurality of products;
   generating the fourth type of stock information according to a production plan of each of the plurality of semifinished products;
   updating, by the management computer, the first type of stock information stored in the first database when a determination is made that the one or more of the plurality of products can be reserved based on the first type of stock information;
   updating, by the management computer, the second type of stock information stored in the first database when a determination is made that the one or more of the plurality of products can be reserved based on the second type of stock information;
   updating, by the management computer, the third type of stock information stored in the second database when a determination is made that the one or more of the plurality of semifinished products can be reserved based on the third type of stock information; and
   updating, by the management computer, the fourth type of stock information stored in the second database when a determination is made that the one or more of the plurality of semifinished products can be reserved based on the fourth type of stock information.

19. A computer-readable storage medium containing computer program instructions for a computer, the instructions performing a method for managing product reserve comprising:
   storing product stock information associated with at least one kind of a plurality of products in a first database, the product stock information including a first type of stock information associated with the plurality of products in stock at a plurality of shops and a second type of stock information associated with the plurality of products in stock at a plurality of first production bases configured to assemble the plurality of products, each of which is assembled using more than one of a plurality of semifinished products;
   storing semifinished product stock information associated with at least one kind of the plurality of semifinished products that can be used in common between all or a part of the plurality of products in a second database, the semifinished product stock information including a third type of stock information associated with the plurality of semifinished products in stock at the plurality of first production bases and a fourth type of stock information associated with the plurality of semifinished products in stock at a plurality of second production bases configured to manufacture the plurality of semifinished products;
   providing each of a plurality of first terminals at each of the plurality of first production bases;
   providing each of a plurality of second terminals at each of the plurality of second production bases;
   providing each of a plurality of third terminals at each of the plurality of shops;
   storing order information indicating at least one order sent from at least one of the plurality of shops or at least one client in a third database;
   receiving, by a management computer, a supply request for one or more of the plurality of products from at least one of the plurality of third terminals each of which is set up at each of the plurality of shops;
   determining, by the management computer, whether the one or more of the plurality of products in stock at the plurality of shops can be reserved in response to the supply request based on the first type of stock information;
   determining, by the management computer, whether the one or more of the plurality of products in stock at the plurality of first production bases can be reserved based on the second type of stock information when a determination is made that the reserve based on the first type of stock information is inadequate;
   reserving, by the management computer, the one or more of the plurality of semifinished products in response to the supply request when a determination is made that the one or more of the plurality of products can be reserved based on the first or second types of stock information;
   determining, by the management computer, whether one or more of the plurality of semifinished products in stock at the plurality of first production bases for production of the one or more of the plurality of products can be reserved in response to the supply request received based on the third type of stock information when a determination is made that the reserve based on the first and second types of stock information is inadequate;
   determining, by the management computer, whether the one or more of the plurality of semifinished products in stock at the plurality of second production bases can be reserved based on the fourth type of stock information when a determination is made that the reserve based on the third type of stock information is inadequate;
   reserving, by the management computer, the one or more of the plurality of semifinished products in response to the supply request when a determination is made that the one or more of the plurality of semifinished products can be reserved based on the third or fourth types of stock information;
   updating, by the management computer, the order information stored in the third database when the supply request is received;

transmitting, by the management computer, first instruction data for kitting an delivering the one or more of the plurality of products to at least one of the plurality of third terminals when a determination is made that the one or more of the plurality of products can be reserved based on the first type of stock information;

transmitting, by the management computer, second instruction data for kitting and delivering the one or more of the plurality of products to at least one of the plurality of first terminals when a determination is made that the reserve based on the first type of stock information is inadequate; and transmitting, by the management computer, at least one replenishment request for the one or more of the plurality of semifinished products to at least one of the plurality of second terminals when a determination is made that the reserve based on the third type of stock information is inadequate.

20. The computer-readable storage medium according to claim 19, further comprising computer program instructions for performing a method comprising:

configuring each of the first and second types of stock information to include current product information associated with the plurality of products in current stock and future product information associated with the plurality of products in future stock;

determining, by the management computer, whether the one or more of the plurality of products can be reserved in response to the supply request based on the current product information;

determining, by the management computer, whether the one or more of the plurality of products can be reserved in response to the supply request based on the future product information when a determination is made that the reserve based on the current product information is inadequate; and reserving, by the management computer, the one or more of the plurality of products in response to the supply request when a determination is made that the one or more of the plurality of products can be reserved based on the current product information or the future product information.

21. The computer-readable storage medium according to claim 19, further comprising computer program instructions for performing a method comprising:

configuring each of the third and fourth types of stock information to include current semifinished product information associated with the plurality of semifinished products in current stock and future semifinished products information associated with the plurality of semifinished products in future stock;

determining, by the management computer, whether the one or more of the plurality of semifinished products can be reserved in response to the supply request based on the current semifinished product information;

determining, by the management computer, whether the one or more of the plurality of semifinished products can be reserved in response to the supply request based on the future semifinished product information when a determination is made that the reserve based on the current semifinished product information is inadequate; and reserving, by the management computer, the one or more of the plurality of semifinished products in response to the supply request when a determination is made that the one or more of the plurality of semifinished products can be reserved based on the current semifinished product information or the future semifinished product information.

22. The computer program according to claim 19, further comprising instructions for: storing a first type of stock information indicating a stock of product at each of a plurality of production bases and a second type of stock information indicating a stock of product at each of a plurality of shops to said first database; selecting at least one of said plurality of production bases and said plurality of shops as a supply source for the product designated by the supply request; determining whether the product in stock at the selected supply source can be reserved in response to the supply request received based on the first type or second type of stock information stored in said first database; determining whether the product in stock at another production base or another shop indicated in first type or second type stock information can be reserved when it is determined that reserve of the product is inadequate; and reserving the product in response to the supply request when it is determined that the product in stock at at least one of the plurality of production bases and the plurality of shops can be reserved.

23. The computer program according to claim 22, further comprising instructions for: specifying a shop geographical position or a client geographical position where the product is provided; and selecting a supply source for the product corresponding to the specified position.

24. The computer program according to claim 19, further comprising instructions for: storing a first type of stock information indicating a stock of semifinished product at each of a plurality of first production bases suitable for the production of semifinished product and a second type of stock information indicating a stock of semifinished product at each of a plurality of second production bases suitable for the production of final product to said second database; selecting at least one of said plurality of first and second production bases as a supply source for the semifinished product corresponding to the supply request; determining whether the semifinished product in stock at the selected supply source can be reserved in response to the supply request based on the first type or second type of stock information stored in said second database; determining whether the semifinished product in stock at another production base indicated in first type or second type stock information can be reserved when it is determined that reserve of the semifinished product is inadequate; and reserving the semifinished product in response to the supply request when it is determined that the semifinished product in stock at at least one of the plurality of first and second production bases can be reserved.

25. The computer program according to claim 24, further comprising instructions for: specifying a shop geographical position or a client geographical position where the product is provided; and selecting a supply source for the semifinished product corresponding to the specified position.

26. The computer-readable storage medium according to claim 19, further comprising computer program instructions for performing a method comprising:

providing each of a plurality of fourth terminals at each of a plurality of supply sources for a plurality of parts for manufacturing at least one of the plurality of semifinished products; and transmitting, by the management computer, at least one procurement request for one or more of the plurality of parts to at least one of the plurality of fourth terminals when a determination is made that the reserve based on the third and fourth types of stock information is inadequate.

* * * * *